US010528827B2

(12) United States Patent
Kozuka et al.

(10) Patent No.: US 10,528,827 B2
(45) Date of Patent: *Jan. 7, 2020

(54) APPARATUS FOR PRESENTING RESULT OF RECOGNIZING RECOGNITION TARGET

(71) Applicant: PANASONIC INTELLECTUAL PROPERTY CORPORATION OF AMERICA, Torrance, CA (US)

(72) Inventors: Kazuki Kozuka, Osaka (JP); Ryota Fujimura, Kanagawa (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,118

(22) Filed: Jan. 24, 2019

(65) Prior Publication Data
US 2019/0156130 A1 May 23, 2019

Related U.S. Application Data

(63) Continuation of application No. 15/437,874, filed on Feb. 21, 2017, now Pat. No. 10,248,873.
(Continued)

(30) Foreign Application Priority Data

Oct. 27, 2016 (JP) ................................. 2016-210328

(51) Int. Cl.
*G06K 9/00* (2006.01)
*B60W 50/14* (2012.01)
(Continued)

(52) U.S. Cl.
CPC .......... *G06K 9/00805* (2013.01); *B60K 35/00* (2013.01); *B60Q 1/00* (2013.01);
(Continued)

(58) Field of Classification Search
CPC ........... G06K 9/00805; G06K 9/00362; B60Q 2400/50; B60Q 1/50; B60Q 5/006;
(Continued)

(56) References Cited

U.S. PATENT DOCUMENTS 9,196,164 B1 11/2015 Urmson et al.
10,248,873 B2 * 4/2019 Kozuka ..................... B60R 1/00
(Continued)

FOREIGN PATENT DOCUMENTS

| EP | 2420986 | 2/2012 |
| JP | 2015-186944 | 10/2015 |
| WO | 2015/156146 | 10/2015 |

OTHER PUBLICATIONS

The Extended European Search Report dated Aug. 11, 2017 for the related European Patent Application No. 17157357.9.

*Primary Examiner* — Amir Alavi
(74) *Attorney, Agent, or Firm* — Greenblum & Bernstein, P.L.C.

(57) ABSTRACT

There are provided an apparatus, a method, and an autonomous moving body which allow a recognition target to be notified with certainty that the recognition target is recognized by an autonomous moving body. A recognition result presenting apparatus according to an embodiment of the present disclosure detects a recognition target (person) present within a predetermined range from an automatic driving vehicle and presents, to the detected recognition target (person), the result of recognition indicating that the automatic driving vehicle recognizes the recognition target (person).

18 Claims, 14 Drawing Sheets

Related U.S. Application Data

(60) Provisional application No. 62/306,181, filed on Mar. 10, 2016.

(51) Int. Cl.

| | |
|---|---|
| *B60K 35/00* | (2006.01) |
| *B60Q 1/50* | (2006.01) |
| *B60Q 5/00* | (2006.01) |
| *B60W 40/00* | (2006.01) |
| *B60W 40/04* | (2006.01) |
| *G08G 1/005* | (2006.01) |
| *B60R 1/00* | (2006.01) |
| *G05D 1/00* | (2006.01) |
| *G05D 1/02* | (2006.01) |
| *G08G 1/16* | (2006.01) |
| *B60Q 1/00* | (2006.01) |
| *B60Q 1/26* | (2006.01) |
| *B60Q 1/52* | (2006.01) |
| *B60Q 9/00* | (2006.01) |

(52) U.S. Cl.
CPC ............... *B60Q 1/26* (2013.01); *B60Q 1/50* (2013.01); *B60Q 1/506* (2013.01); *B60Q 1/525* (2013.01); *B60Q 5/005* (2013.01); *B60Q 5/006* (2013.01); *B60Q 9/008* (2013.01); *B60R 1/00* (2013.01); *B60W 40/00* (2013.01); *B60W 40/04* (2013.01); *B60W 50/14* (2013.01); *G05D 1/0088* (2013.01); *G05D 1/0248* (2013.01); *G06K 9/00362* (2013.01); *G08G 1/005* (2013.01); *G08G 1/166* (2013.01); *G08G 1/167* (2013.01); *B60K 2370/179* (2019.05); *B60K 2370/193* (2019.05); *B60K 2370/334* (2019.05); *B60K 2370/797* (2019.05); *B60Q 2400/50* (2013.01); *B60R 2300/307* (2013.01); *B60R 2300/804* (2013.01); *B60R 2300/8033* (2013.01)

(58) Field of Classification Search
CPC ..... B60Q 5/005; B60R 1/00; B60R 2300/804; B60R 2300/8033; G08G 1/166; G08G 1/005; G08G 1/167; G05D 1/0088; G05D 1/0248; B60W 50/14; B60W 40/04; B60W 40/00; B60K 35/00; B60K 2350/1084; B60K 2350/2052; B60K 2350/924; B60K 2350/965
See application file for complete search history.

(56) References Cited

U.S. PATENT DOCUMENTS

| | | | |
|---|---|---|---|
| 2005/0280711 A1* | 12/2005 | Ishii | H04N 5/232 348/207.99 |
| 2014/0062685 A1 | 3/2014 | Tamatsu et al. | |
| 2015/0239436 A1* | 8/2015 | Kanai | B60T 7/08 701/23 |
| 2015/0336502 A1 | 11/2015 | Hillis et al. | |
| 2016/0128795 A1* | 5/2016 | Kozuka | A61B 6/03 715/771 |
| 2016/0347293 A1* | 12/2016 | Chen | B60T 7/22 |
| 2017/0262710 A1* | 9/2017 | Kozuka | B60Q 1/26 |
| 2017/0262715 A1* | 9/2017 | Kozuka | B60Q 9/008 |
| 2017/0300762 A1* | 10/2017 | Ishii | B60R 1/00 |
| 2019/0156130 A1* | 5/2019 | Kozuka | B60R 1/00 |

\* cited by examiner

APPARATUS FOR PRESENTING RESULT OF RECOGNIZING RECOGNITION TARGET

CROSS REFERENCE TO RELATED APPLICATIONS

This is a continuation application of U.S. patent application Ser. No. 15/437,874, filed Feb. 21, 2017, which claims the benefit of U. S. Provisional Application No. 62/306,181, filed on Mar. 10, 2016, and claims the benefit of Japanese Patent Application No. 2016-210328, filed on Oct. 27, 2016. The entire disclosure of each of the above-identified applications, including the specification, drawings, and claims, is incorporated herein by reference in its entirety.

BACKGROUND

1. Technical Field

The present disclosure relates to a recognition result presenting apparatus, a recognition result presentation method, and an autonomous moving body which allow the result of recognizing a recognition target that is present around an autonomous moving body to be presented.

2. Description of the Related Art

The development of an autonomous driving vehicle is ongoing currently. The autonomous driving vehicle recognizes a pedestrian that is present around the autonomous driving vehicle and controls driving of the autonomous driving vehicle in accordance with the result of recognition.

For example, International Publication No. 2015/156146 discloses a technique in which an onboard display device installed in a vehicle acquires driving action specifics and a driving action factor output from an onboard control device and provides a notification of the driving action specifics and the driving action factor by displaying an image or outputting a sound.

For example, U.S. Pat. No. 9,196,164 discloses a technique in which an autonomous driving vehicle provides a notification of what the vehicle is going to or is currently doing to a pedestrian.

For example, Japanese Unexamined Patent Application Publication No. 2015-186944 discloses a technique in which a notification unit of a moving body that automatically travels externally provides a notification of detected information, a determination result, a detected movement state, and so on in the directions of areas in one of which a detected monitoring target is present by displaying on the vehicle body the detected information and so on or outputting a sound.

However, with the related-art techniques described above, the recognition target is not notified with certainty that the recognition target is recognized by the autonomous moving body, and further improvement is anticipated.

SUMMARY

One non-limiting and exemplary embodiment provides a recognition result presenting apparatus, a recognition result presentation method, and an autonomous moving body which allow a recognition target to be notified with certainty that the recognition target is recognized by an autonomous moving body, in order to address the above-described issue.

In one general aspect, the techniques disclosed here feature a recognition result presenting apparatus for presenting a result of recognizing a recognition target present around an autonomous moving body, including a detection unit and a presenting unit. The detection unit detects the recognition target present around the autonomous moving body. The presenting unit presents, to the recognition target detected by the detection unit, a recognition result indicating that the autonomous moving body recognizes the recognition target as a result of detection of the recognition target by the detection unit.

According to the present disclosure, it is possible to notify a recognition target with certainty that the recognition target is recognized by an autonomous moving body.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
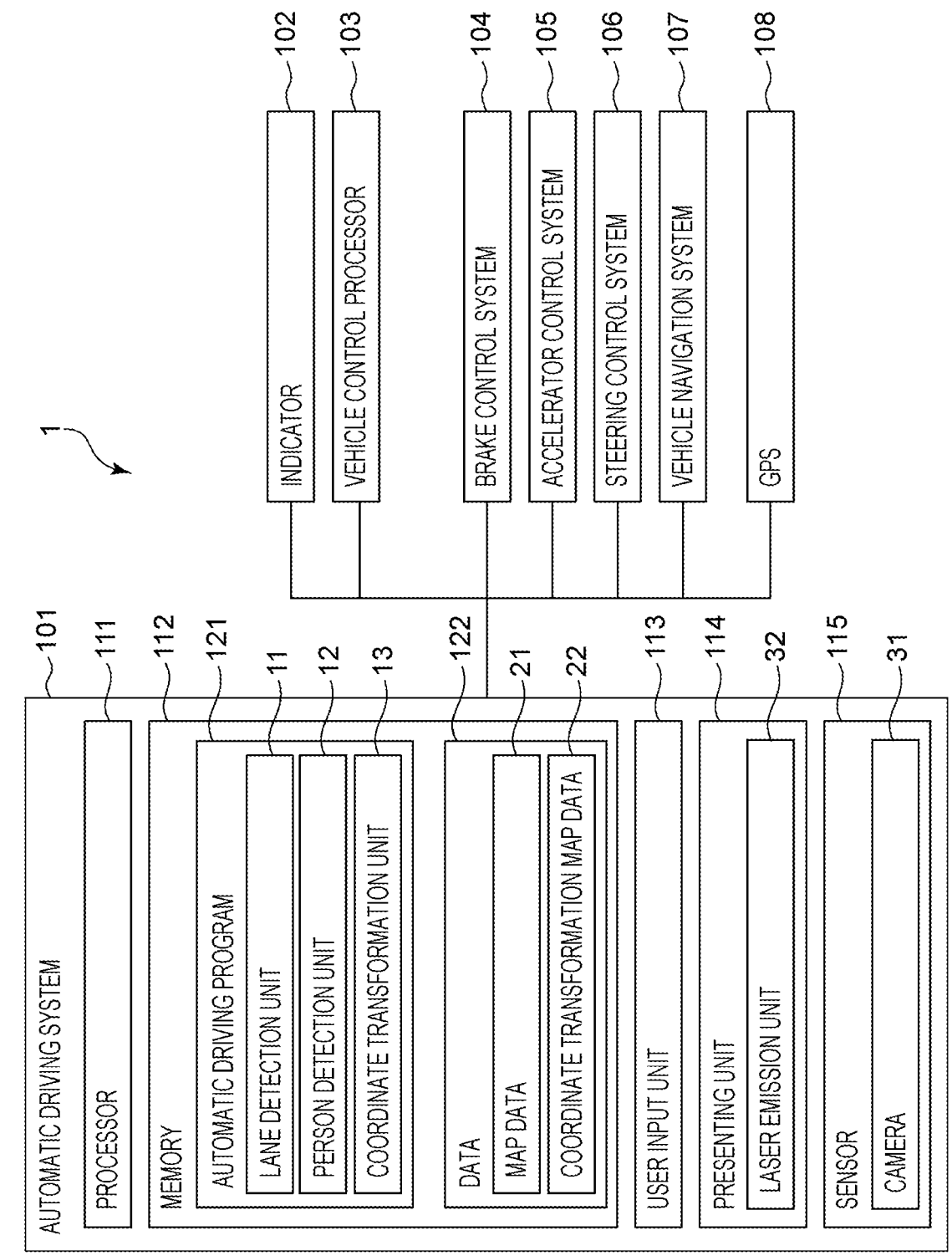
FIG. 1 is a block diagram illustrating a configuration of an automatic driving vehicle according to a first embodiment.

Underlying Knowledge Forming Basis of the Present Disclosure

The development of an autonomous driving vehicle is ongoing currently. The autonomous driving vehicle recognizes a pedestrian that is present around the autonomous driving vehicle and controls driving of the autonomous driving vehicle in accordance with the result of recognition.

For example, International Publication No. 2015/156146 discloses a technique in which an onboard display device installed in a vehicle acquires driving action specifics and a driving action factor output from an onboard control device and provides a notification of the driving action specifics and the driving action factor by displaying an image or outputting a sound.

For example, U.S. Pat. No. 9,196,164 discloses a technique in which an autonomous driving vehicle provides a notification of what the vehicle is going to or is currently doing to a pedestrian.

For example, Japanese Unexamined Patent Application Publication No. 2015-186944 discloses a technique in which a notification unit of a moving body that automatically travels externally provides a notification of detected information, a determination result, a detected movement state, and so on in the directions of areas in one of which a detected monitoring target is present by displaying on the vehicle body the detected information and so on or outputting a sound.

According to International Publication No. 2015/156146 described above, the occupant is notified of the driving action specifics of the vehicle. According to U.S. Pat. No. 9,196,164 described above, the pedestrian is notified of an action to be taken by the autonomous driving vehicle. Therefore, the pedestrian around the autonomous driving vehicle is unable to know whether he/she is recognized by the autonomous driving vehicle and to determine whether he/she can cross in front of the autonomous driving vehicle.

According to Japanese Unexamined Patent Application Publication No. 2015-186944 described above, a notification that a monitoring target has been recognized is provided by lighting a light-emitting diode (LED) oriented in the direction in which the presence of the monitoring target is detected. In a case where a plurality of monitoring targets are present in the same direction, each of the monitoring targets is not notified whether he/she is recognized. Accordingly, in a case where a plurality of pedestrians are present in the same direction, a pedestrian that is recognized and a pedestrian that is not recognized among the plurality of pedestrians are not identified, and therefore, each pedestrian is unable to confirm whether he/she is recognized by the autonomous driving vehicle.

In order to address the issue described above, a recognition result presenting apparatus according to an aspect of the present disclosure is a recognition result presenting apparatus for presenting a result of recognizing a recognition target present around an autonomous moving body, including: a detection unit that detects the recognition target present around the autonomous moving body; and a presenting unit that presents, to the recognition target detected by the detection unit, a recognition result indicating that the autonomous moving body recognizes the recognition target as a result of detection of the recognition target by the detection unit.

With the above-described configuration, a recognition target that is present around the autonomous moving body is detected, and a recognition result indicating that the autonomous moving body recognizes the recognition target as a result of detection of the recognition target is presented to the detected recognition target.

Accordingly, it is possible to notify the recognition target with certainty that the recognition target is recognized by the autonomous moving body.

In the above-described recognition result presenting apparatus, the presenting unit may include a light emission unit that emits light in a direction in which the recognition target is present.

With the above-described configuration, it is possible to notify the recognition target with certainty that the recognition target is recognized by the autonomous moving body by using light emitted in the direction in which the recognition target is present.

In the above-described recognition result presenting apparatus, the light emission unit may emit light in a predetermined shape toward the ground at a position where the recognition target is present.

With the above-described configuration, it is possible to notify the recognition target with certainty that the recognition target is recognized by the autonomous moving body by using light in a predetermined shape emitted toward the ground at the position where the recognition target is present.

In the above-described recognition result presenting apparatus, the light emission unit may emit light in a predetermined shape toward the ground at a position where the recognition target is present and may additionally emit light to a straight line that connects the position on the ground at which the recognition target is present and a position on the ground at which the autonomous moving body is present.

With the above-described configuration, it is possible to notify the recognition target with certainty that the recognition target is recognized by the autonomous moving body by using light in a predetermined shape emitted toward the ground at the position where the recognition target is present and light emitted to the straight line that connects the position on the ground at which the recognition target is present and the position on the ground at which the autonomous moving body is present.

In the above-described recognition result presenting apparatus, the presenting unit may include a sound output unit that outputs a predetermined sound in a direction in which the recognition target is present.

With the above-described configuration, it is possible to notify the recognition target with certainty that the recognition target is recognized by the autonomous moving body by using a predetermined sound output in the direction in which the recognition target is present.

The above-described recognition result presenting apparatus may further include an image capture unit that captures an image of a scene around the autonomous moving body. The detection unit may detect the recognition target present in the captured image, and the presenting unit may include a display unit that is disposed on a surface of the autonomous moving body and that displays the captured image in which the recognition target detected by the detection unit is indicated so as to be identifiable.

With the above-described configuration, an image of a scene around the autonomous moving body is captured, a recognition target in the captured image is detected, and the captured image in which the detected recognition target is indicated so as to be identifiable is displayed on the display unit disposed on the surface of the autonomous moving body.

Accordingly, it is possible to notify the recognition target with certainty that the recognition target is recognized by the autonomous moving body by using the image which is displayed on the display unit disposed on the surface of the autonomous moving body and in which the detected recognition target is indicated so as to be identifiable.

In the above-described recognition result presenting apparatus, the display unit may display an image obtained by horizontally flipping the captured image.

With the above-described configuration, a horizontally flipped image is displayed, and therefore, the detected recognition target is displayed as its reflection in a mirror. Accordingly, the recognition target can intuitively know the result of recognition.

In the above-described recognition result presenting apparatus, the recognition target may be a person. The above-described recognition result presenting apparatus may further include: an attribute determination unit that determines an attribute of the person detected by the detection unit; and a presentation method selection unit that selects a presentation method in accordance with the attribute determined by the attribute determination unit. The presenting unit may present the recognition result in accordance with the presentation method selected by the presentation method selection unit.

With the above-described configuration, the recognition target is a person, an attribute of the detected person is determined, a presentation method is selected in accordance with the determined attribute, and the recognition result is presented in accordance with the selected presentation method.

Accordingly, it is possible to present the recognition result in accordance with the presentation method that is appropriate for the attribute of the detected person.

The above-described recognition result presenting apparatus may further include: a degree-of-danger determination unit that determines a degree of danger to which the recognition target detected by the detection unit is exposed; and a presentation method selection unit that selects a presentation method in accordance with the degree of danger determined by the degree-of-danger determination unit. The presenting unit may present the recognition result in accordance with the presentation method selected by the presentation method selection unit.

With the above-described configuration, the degree of danger to which the detected recognition target is exposed is determined, a presentation method is selected in accordance with the determined degree of danger, and the recognition result is presented in accordance with the selected presentation method.

Accordingly, it is possible to present the recognition result in accordance with the presentation method that is appropriate for the degree of danger to which the detected recognition target is exposed.

In the above-described recognition result presenting apparatus, the degree of danger may be one of a first degree of danger and a second degree of danger that is lower than the first degree of danger, and the presentation method selection unit may make a presentation method selected in a case where the degree-of-danger determination unit determines the degree of danger to be the first degree of danger different from a presentation method selected in a case where the degree-of-danger determination unit determines the degree of danger to be the second degree of danger.

With the above-described configuration, the degree of danger is one of a first degree of danger and a second degree of danger that is lower than the first degree of danger, and a presentation method selected in a case where the degree of danger is determined to be the first degree of danger is made different from a presentation method selected in a case where the degree of danger is determined to be the second degree of danger.

Accordingly, the presentation method selected in a case where the degree of danger is high is different from the presentation method selected in a case where the degree of danger is low, and therefore, the recognition target can recognize the degree of danger to which the recognition target is exposed by checking the recognition result presented in accordance with the degree of danger.

In the above-described recognition result presenting apparatus, the presenting unit may include a light emission unit that emits light in a direction in which the recognition target is present, and the presentation method selection unit may make a color of the light emitted in a case where the degree-of-danger determination unit determines the degree of danger to be the first degree of danger different from a color of the light emitted in a case where the degree-of-danger determination unit determines the degree of danger to be the second degree of danger.

With the above-described configuration, light is emitted in the direction in which the recognition target is present, and the color of the light emitted in the case where the degree of danger is determined to be the first degree of danger is made different from the color of the light emitted in the case where the degree of danger is determined to be the second degree of danger.

Accordingly, the recognition target can recognize the degree of danger to which the recognition target is exposed by checking the color of the emitted light.

In the above-described recognition result presenting apparatus, the presenting unit may include a sound output unit that outputs a predetermined sound in a direction in which the recognition target is present, and the presentation method selection unit may make the sound output in a case where the degree-of-danger determination unit determines the degree of danger to be the first degree of danger different from the sound output in a case the degree-of-danger determination unit determines the degree of danger to be the second degree of danger.

With the above-described configuration, a predetermined sound is output in the direction in which the recognition target is present, and the sound output in the case where the degree of danger is determined to be the first degree of danger is made different from the sound output in the case where the degree of danger is determined to be the second degree of danger.

Accordingly, the recognition target can recognize the degree of danger to which the recognition target is exposed by checking the output predetermined sound.

In the above-described recognition result presenting apparatus, the recognition target may be one of a plurality of recognition targets; the detection unit may detect the plurality of recognition targets; the degree-of-danger determination unit may determine the degree of danger to which each of the plurality of recognition targets detected by the detection unit is exposed; and the presenting unit may present the recognition result to each of the plurality of recognition targets sequentially from a recognition target that is exposed to a highest degree of danger among the plurality of recognition targets.

With the above-described configuration, the recognition unit is one of a plurality of recognition targets, the plurality of recognition targets are detected, the degree of danger to which each of the plurality of detected recognition targets is exposed is determined, and the recognition result is presented to each of the plurality of recognition targets sequentially from a recognition target that is exposed to the highest degree of danger among the plurality of recognition targets.

Accordingly, the recognition result is presented to each of the plurality of recognition targets sequentially from a recognition target that is exposed to the highest degree of danger among the plurality of recognition targets, and therefore, each of the plurality of recognition targets can recognize the degree of danger to which the recognition target is exposed.

An autonomous moving body according to another aspect of the present disclosure is an autonomous moving body including: the above-described recognition result presenting apparatus; and a controller that controls movement of the autonomous moving body on the basis of the recognition result obtained by the recognition result presenting apparatus.

With the above-described configuration, the above-described recognition result presenting apparatus can be applied to an autonomous moving body.

A recognition result presentation method according to another aspect of the present disclosure is a recognition result presentation method for a recognition result presenting apparatus presenting a result of recognizing a recognition target present around an autonomous moving body, including: detecting the recognition target present around the autonomous moving body; and presenting, to the detected recognition target, a recognition result indicating that the autonomous moving body recognizes the recognition target as a result of detection of the recognition target.

With the above-described configuration, a recognition target that is present around the autonomous moving body is detected, and a recognition result indicating that the autonomous moving body recognizes the recognition target as a result of detection of the recognition target is presented to the detected recognition target.

Accordingly, it is possible to notify the recognition target with certainty that the recognition target is recognized by the autonomous moving body.

Hereinafter, embodiments of the present disclosure will be described with reference to the attached drawings. Note that the following embodiments are examples in which the present disclosure is embodied, and are not intended to limit the technical scope of the present disclosure.

First Embodiment

FIG. 1 is a block diagram illustrating a configuration of an automatic driving vehicle according to a first embodiment. An automatic driving vehicle 1 illustrated in FIG. 1 includes an automatic driving system 101, an indicator 102, a vehicle control processor 103, a brake control system 104, an accelerator control system 105, a steering control system 106, a vehicle navigation system 107, and a global positioning system (GPS) 108.

The automatic driving vehicle 1 is a vehicle that autonomously travels and is an example of an autonomous moving body. In the first embodiment, the automatic driving vehicle 1 is a car; however, the present disclosure is not specifically limited to this; and the automatic driving vehicle 1 may be any vehicle among various types of vehicles, such as a motorcycle, a truck, a bus, a train, and an aircraft.

The automatic driving system 101 includes a processor 111, a memory 112, a user input unit 113, a presenting unit 114, and a sensor 115.

The memory 112 is a computer-readable recording medium, such as a hard disk drive, a read-only memory (ROM), a random access memory (RAM), an optical disc, or a semiconductor memory, for example. The memory 112 stores an automatic driving program 121 executed by the processor 111 and data 122 used by the processor 111.

The data 122 includes map data 21 and coordinate transformation map data 22. The map data 21 includes, but is not limited to, topographic information, lane information indicating travel lanes, intersection information regarding intersections, and speed limit information indicating speed limits, for example. The coordinate transformation map data 22 is a coordinate transformation map in which the position of each pixel on a captured image captured by using a camera 31 is associated with a position in real space.

The processor 111 is a central processing unit (CPU), for example, and executes the automatic driving program 121 stored in the memory 112. When the processor 111 executes the automatic driving program 121, the automatic driving vehicle 1 autonomously travels. The processor 111 reads the data 122 from the memory 112, writes the data 122 to the memory 112, and updates the data 122 stored in the memory 112.

The automatic driving program 121 causes the processor 111 to function as a lane detection unit 11, a person detection unit 12, and a coordinate transformation unit 13.

The lane detection unit 11 recognizes a lane marked on the road from a captured image captured by using the camera 31 and detects the lane along which the automatic driving vehicle 1 is traveling.

The person detection unit 12 detects a person (recognition target) that is present around the automatic driving vehicle 1 from a captured image captured by using the camera 31. The person detection unit 12 machine-learns a multilayer neural network through deep learning, inputs the captured image to the machine-learned neural network, and detects the person included in the captured image. The person detection unit 12 encloses the detected person present in the captured image with a rectangular frame.

The coordinate transformation unit 13 transforms coordinates in a captured image into coordinates in real space by using the coordinate transformation map data 22.

The user input unit 113 receives various types of information input by a user. The user input unit 113 is constituted by a button or a touch panel, for example.

The presenting unit 114 presents various types of information. The presenting unit 114 presents, to a person (recognition target) detected by the person detection unit 12, the result of recognition indicating that the automatic driving vehicle 1 recognizes the person (recognition target) as a result of detection of the person (recognition target) by the person detection unit 12. The presenting unit 114 includes a laser emission unit 32. The laser emission unit 32 is disposed in a front portion of the automatic driving vehicle 1 and emits a laser beam toward a person that is present in front of the automatic driving vehicle 1. The laser emission unit 32 may emit laser beams toward persons that are present around the automatic driving vehicle 1, that is, a person present behind the automatic driving vehicle 1, a person present to the right of the automatic driving vehicle 1, and a person present to the left of the automatic driving vehicle 1, in addition to a person present in front of the automatic driving vehicle 1. Preferably, the laser emission unit 32 emits a linear laser beam toward the ground between the laser emission unit 32 and the person.

The laser emission unit 32 emits a laser beam toward the position of the person, the position being obtained by a transformation into coordinates in real space performed by the coordinate transformation unit 13. In a case where the direction in which the person is present and the distance from the automatic driving vehicle 1 to the person are identified by the person detection unit 12, the laser emission unit 32 may emit a laser beam in a predetermined shape toward the ground at the position where the person (recognition target) is present.

The sensor 115 measures the environment around the automatic driving vehicle 1 and the environment inside the automatic driving vehicle 1. The sensor 115 includes, but is not limited to, a speedometer that measures the speed of the automatic driving vehicle 1, an accelerometer that measures the acceleration of the automatic driving vehicle 1, a gyroscope that measures the orientation of the automatic driving vehicle 1, and an engine temperature sensor, for example.

The sensor 115 includes the camera 31. The camera 31 is an example of an image capture unit, is disposed in the vicinity of the rearview mirror of the automatic driving vehicle 1, and is used to capture an image of a scene in front of the automatic driving vehicle 1. The camera 31 may be used to capture images of scenes around the automatic driving vehicle 1, that is, a scene behind the automatic driving vehicle 1, a scene to the right of the automatic driving vehicle 1, and a scene to the left of the automatic driving vehicle 1, in addition to a scene in front of the automatic driving vehicle 1.

The indicator 102 is a device used when the automatic driving vehicle 1 makes a left turn, a right turn, or a lane change to indicate the direction to people around the automatic driving vehicle 1. The vehicle control processor 103 controls the automatic driving vehicle 1. The brake control system 104 controls the automatic driving vehicle 1 to slow down. The accelerator control system 105 controls the speed of the automatic driving vehicle 1. The steering control system 106 adjusts the direction of travel of the automatic driving vehicle 1. The vehicle navigation system 107 determines the travel route of the automatic driving vehicle 1 and presents the travel route of the automatic driving vehicle 1. The GPS 108 acquires the current position of the automatic driving vehicle 1.

The processor 111 controls the direction and speed of the automatic driving vehicle 1 on the basis of the result of sensing by the sensor 115, the result of detection by the lane detection unit 11, and the result of detection by the person detection unit 12. The processor 111 causes the accelerator control system 105 to increase the speed of the automatic driving vehicle 1, causes the brake control system 104 to decrease the speed of the automatic driving vehicle 1, and causes the steering control system 106 to change the direction of the automatic driving vehicle 1.

Figure 2:
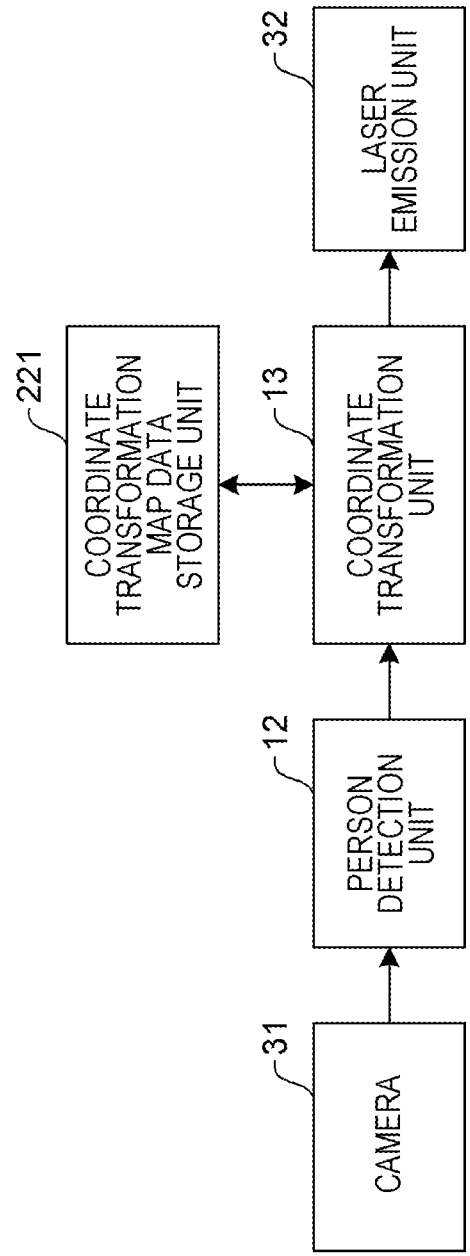
FIG. 2 is a diagram illustrating a configuration of a recognition result presenting apparatus according to the first embodiment.

FIG. 2 is a diagram illustrating a configuration of a recognition result presenting apparatus according to the first embodiment. The recognition result presenting apparatus illustrated in FIG. 2 includes the camera 31, the person detection unit 12, the coordinate transformation unit 13, the laser emission unit 32, and a coordinate transformation map data storage unit 221.

In the recognition result presenting apparatus illustrated in FIG. 2, components that are the same as those in FIG. 1 are assigned the same reference numerals, and description thereof will be omitted. The coordinate transformation map data storage unit 221 is constituted by the memory 112 illustrated in FIG. 1 and stores the coordinate transformation map data 22.

Now, an operation performed by the recognition result presenting apparatus according to the first embodiment is described.

Figure 3:
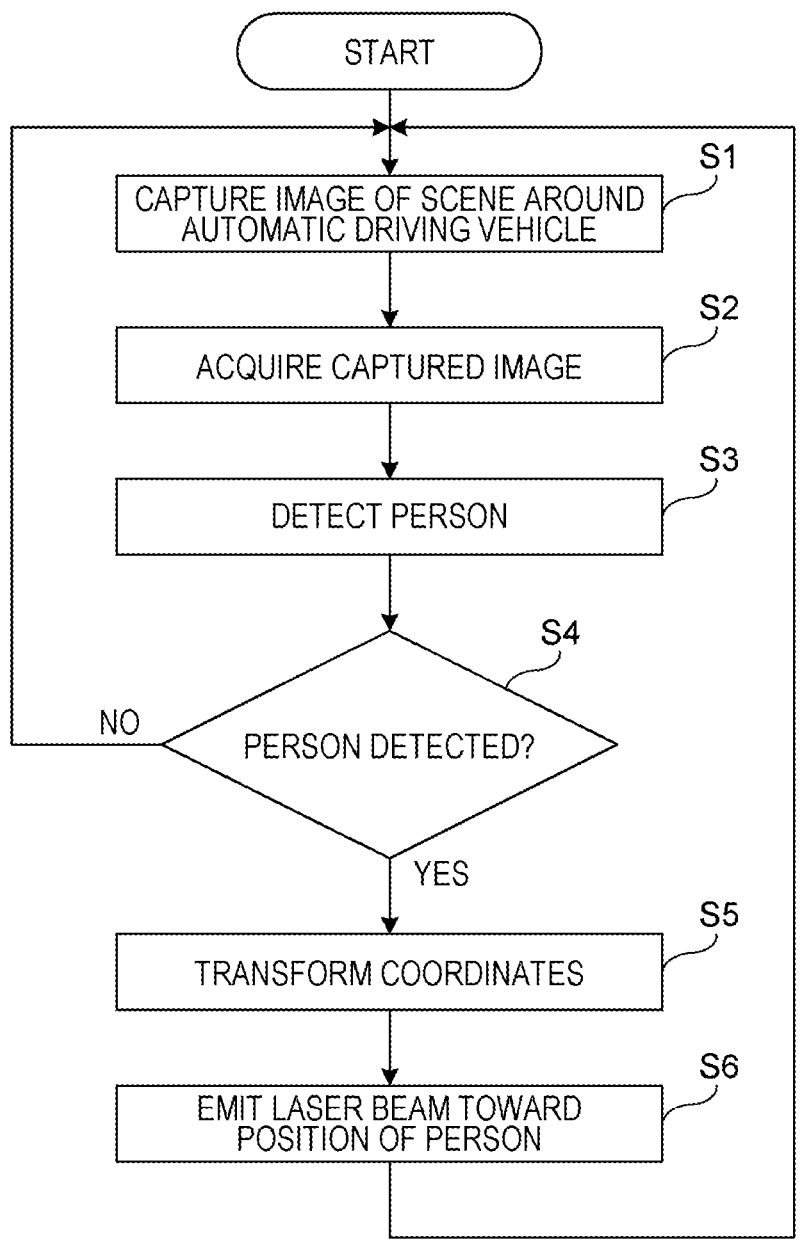
FIG. 3 is a flowchart for describing an operation performed by the recognition result presenting apparatus according to the first embodiment.
Figure 4:
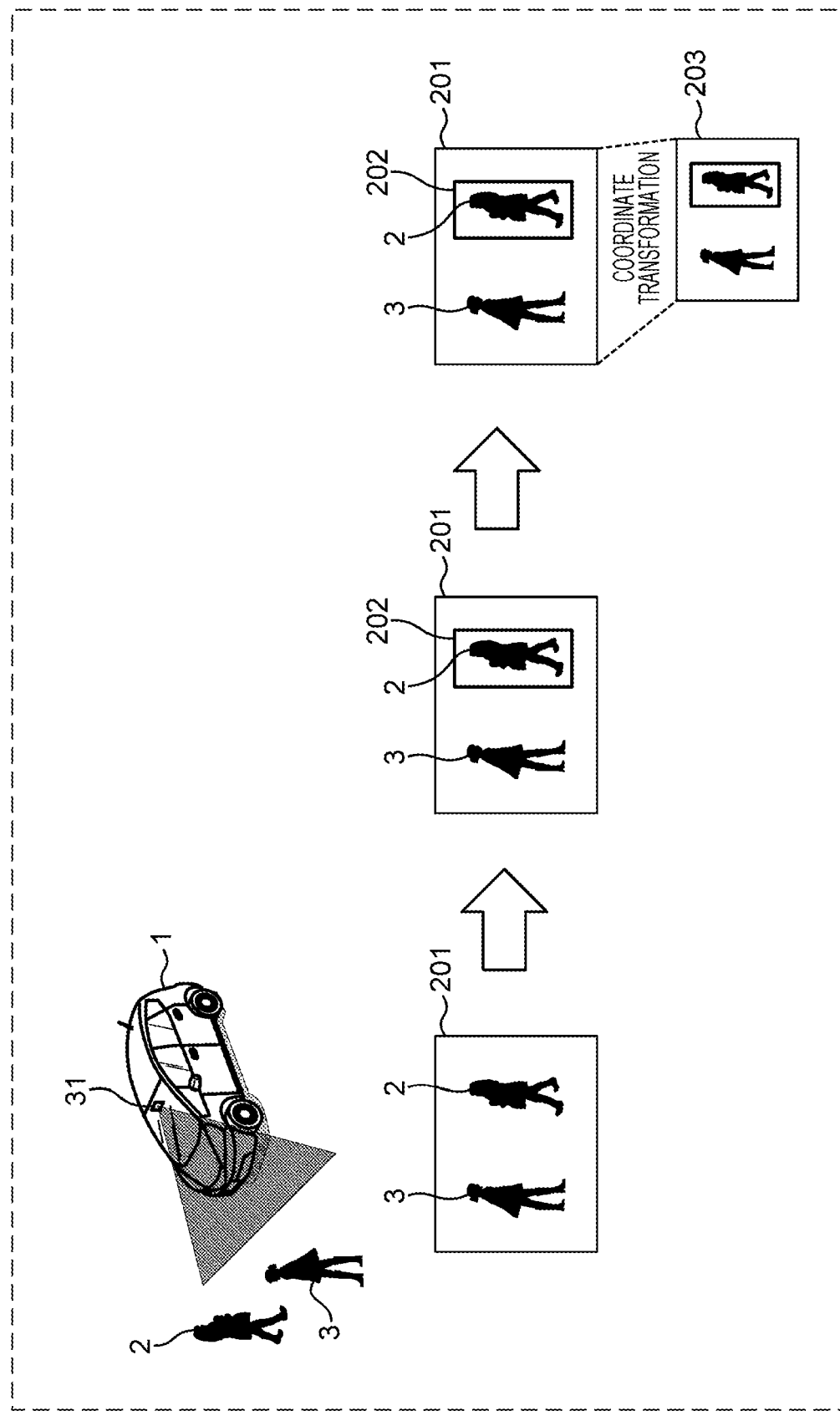
FIG. 4 is a schematic diagram for describing acquisition of a captured image, detection of a person, and a coordinate transformation performed on the captured image according to the first embodiment.

FIG. 3 is a flowchart for describing an operation performed by the recognition result presenting apparatus according to the first embodiment. FIG. 4 is a schematic diagram for describing acquisition of a captured image, detection of a person, and a coordinate transformation performed on the captured image according to the first embodiment.

First, in step S1, the camera 31 is used to capture an image of a scene in the direction of travel of the automatic driving vehicle 1. At this time, the camera 31 is disposed at a position where an image of a scene in front of the automatic driving vehicle 1 can be captured, and is used to capture an image of a scene in front of the automatic driving vehicle 1. In a case where the automatic driving vehicle 1 travels forward, it is preferable to capture an image by using a camera disposed in a front portion of the automatic driving vehicle 1. In a case where the automatic driving vehicle 1 travels backward, it is preferable to capture an image by using a camera disposed in a rear portion of the automatic driving vehicle 1.

Next, in step S2, the person detection unit 12 acquires the captured image, which is referred to as a captured image 201, captured by using the camera 31. The captured image 201 illustrated in FIG. 4 includes a person 2 and a person 3.

Subsequently, in step S3, the person detection unit 12 detects a person included in the captured image acquired from the camera 31. In FIG. 4, the person detection unit 12 detects the person 2 among the person 2 and the person 3 included in the captured image 201 and adds a rectangular frame 202 so as to enclose the detected person 2. Note that, in FIG. 4, the person 3 is not detected as a person. Accordingly, all persons in the captured image are not necessarily detected due to the detection accuracy, for example.

Subsequently, in step S4, the coordinate transformation unit 13 determines whether a person is detected by the person detection unit 12 from the captured image. If it is determined that no person is detected (No in step S4), the flow returns to step S1.

On the other hand, if it is determined that a person is detected (Yes in step S4), the coordinate transformation unit 13 transforms coordinates in the captured image into coordinates in real space by using the coordinate transformation map data 22 in step S5. As illustrated in FIG. 4, a coordinate transformation is performed on the captured image 201 to thereby generate a real-space image 203 that corresponds to the coordinates in real space.

Subsequently, in step S6, the laser emission unit 32 emits a laser beam toward the position of the person detected by the person detection unit 12. At this time, the laser emission unit 32 identifies the position at which the person 2 is actually present from the coordinates of the person 2 in the real-space image 203 that are obtained as a result of the transformation performed by the coordinate transformation unit 13, and emits a laser beam toward the identified position. Thereafter, the flow returns to step S1.

Note that the process from step S1 to step S6 is repeated during a period from when the power of the automatic driving vehicle 1 is turned on until when the power is turned off.

Figure 5:
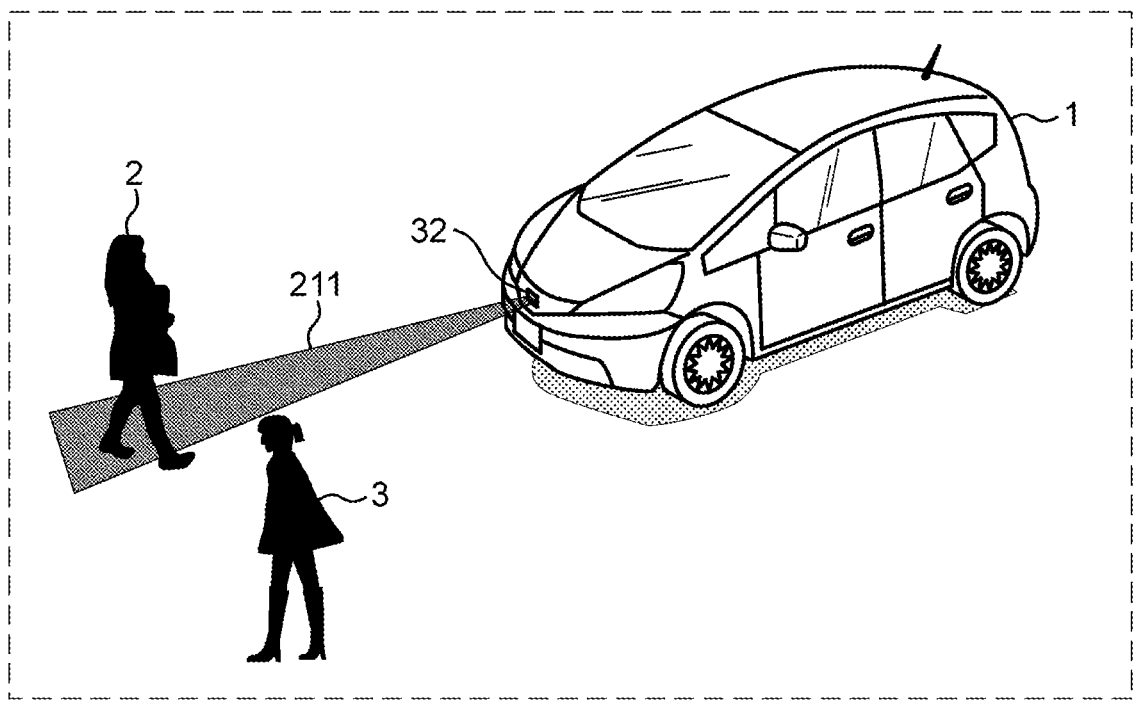
FIG. 5 is a diagram for describing a process for presenting a recognition result according to the first embodiment.

FIG. 5 is a diagram for describing a process for presenting a recognition result according to the first embodiment. As illustrated in FIG. 5, in a case where the person 2 is detected, the laser emission unit 32 emits a laser beam 211 toward the position of the detected person 2. The person 3 is not detected, and therefore, the laser beam 211 is not emitted toward the person 3. Accordingly, the person 2 and the person 3 can each know whether he/she is recognized by the automatic driving vehicle 1 and can determine an action to be taken against the automatic driving vehicle 1, that is, determine whether he/she is to cross in front of the automatic driving vehicle 1, for example.

As described above, the result of recognition indicating that the automatic driving vehicle 1 recognizes the recognition target as a result of detection of the recognition target is presented to the detected recognition target, and therefore, it is possible to notify the recognition target with certainty that the recognition target is recognized by the automatic driving vehicle 1.

In the first embodiment, a laser beam is emitted to the person; however, the present disclosure is not specifically limited to this. Light from another light source, such as an LED, may be emitted to the person.

The presenting unit 114 may include a projector, and light (image) from the projector may be projected onto the person. In this case, it is preferable that the projector projects linear light onto the ground between the projector and the person.

Figure 6:
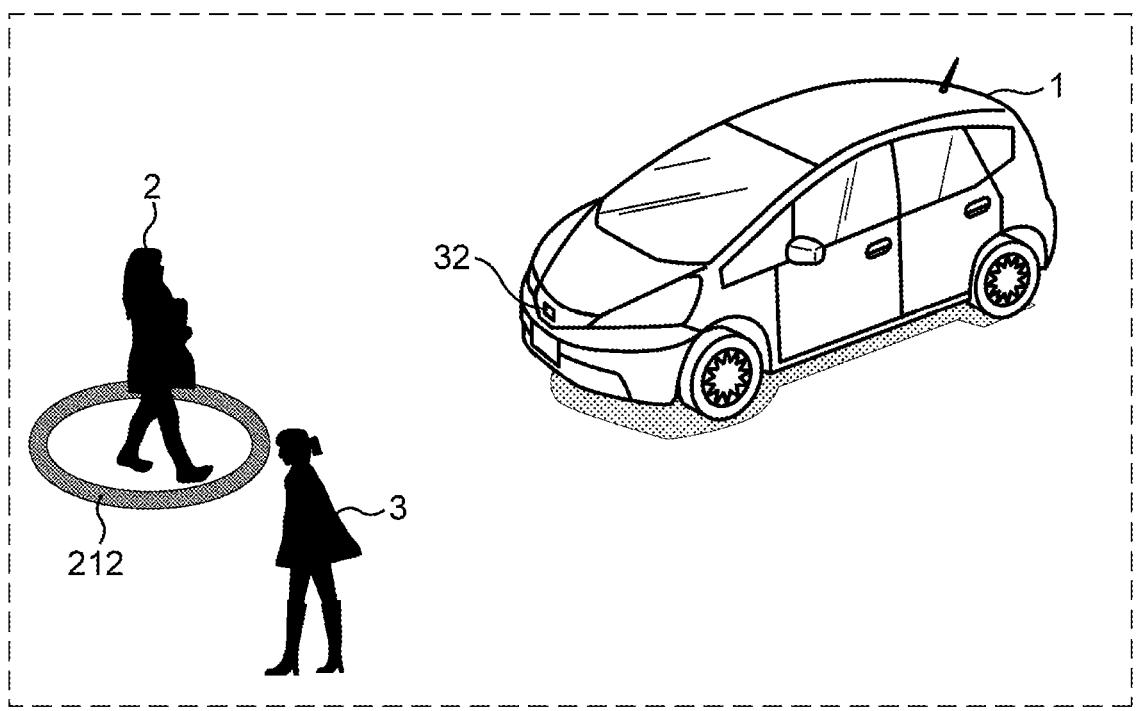
FIG. 6 is a diagram for describing a process for presenting a recognition result according to a first modification of the first embodiment.

FIG. 6 is a diagram for describing a process for presenting a recognition result according to a first modification of the first embodiment.

According to the first modification of the first embodiment, light in a predetermined shape is emitted toward the ground at the position where the recognition target is present. If the direction in which a person is present and the distance to the person are identified by the sensor 115, a laser beam can be emitted toward the feet of the detected person. As illustrated in FIG. 6, in a case where the person 2 is detected, the laser emission unit 32 emits a laser beam 212 in a predetermined shape toward the ground at the position where the person 2 is present. In FIG. 6, the laser beam 212 in a circle shape is emitted. The person 3 is not detected, and therefore, the laser beam 212 in a circle shape is not emitted toward the person 3. Accordingly, the person 2 and the person 3 can each know whether he/she is recognized by the automatic driving vehicle 1 and can determine an action to be taken against the automatic driving vehicle 1, that is, determine whether he/she is to cross in front of the automatic driving vehicle 1, for example.

Figure 7:
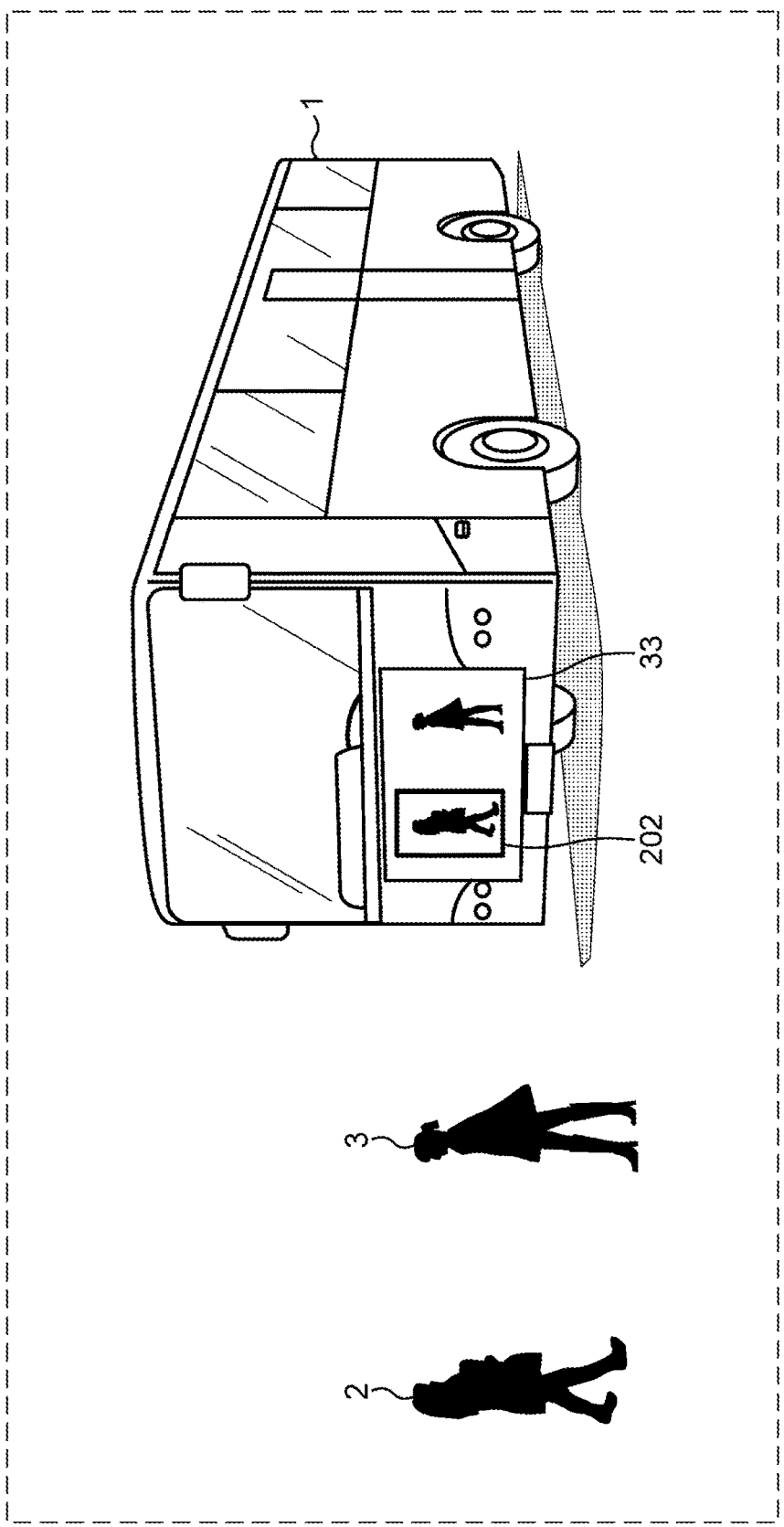
FIG. 7 is a diagram for describing a process for presenting a recognition result according to a second modification of the first embodiment.

FIG. 7 is a diagram for describing a process for presenting a recognition result according to a second modification of the first embodiment.

According to the second modification of the first embodiment, the recognition result presenting apparatus does not include the coordinate transformation unit 13, the coordinate transformation map data storage unit 221, and the laser emission unit 32 but includes a display unit 33 that is disposed on the surface of the automatic driving vehicle 1 and that displays an image in which a person (recognition target) detected by the person detection unit 12 is indicated so as to be identifiable.

As illustrated in FIG. 7, the display unit 33 is a liquid crystal display device, for example, and is disposed on the surface of the automatic driving vehicle 1. Note that the display unit 33 is disposed at least one position among the front, the back, the right side, and the left side of the automatic driving vehicle 1. The person detection unit 12 detects the person 2 among the person 2 and the person 3 included in the captured image 201 and adds the rectangular frame 202 so as to enclose the detected person 2. The display unit 33 displays in real time the image to which the rectangular frame 202 is added so as to enclose the detected person 2. The person 3 is not detected, and therefore, the rectangular frame 202 that encloses the person 3 is not displayed. Accordingly, the person 2 and the person 3 can each know whether he/she is recognized by the automatic driving vehicle 1 and can determine an action to be taken against the automatic driving vehicle 1, that is, determine whether he/she is to cross in front of the automatic driving vehicle 1, for example.

Preferably, the display unit 33 displays a horizontally flipped image. As a result, the person is displayed as his/her reflection in a mirror. Accordingly, the person can intuitively know the result of recognition.

Figure 8:
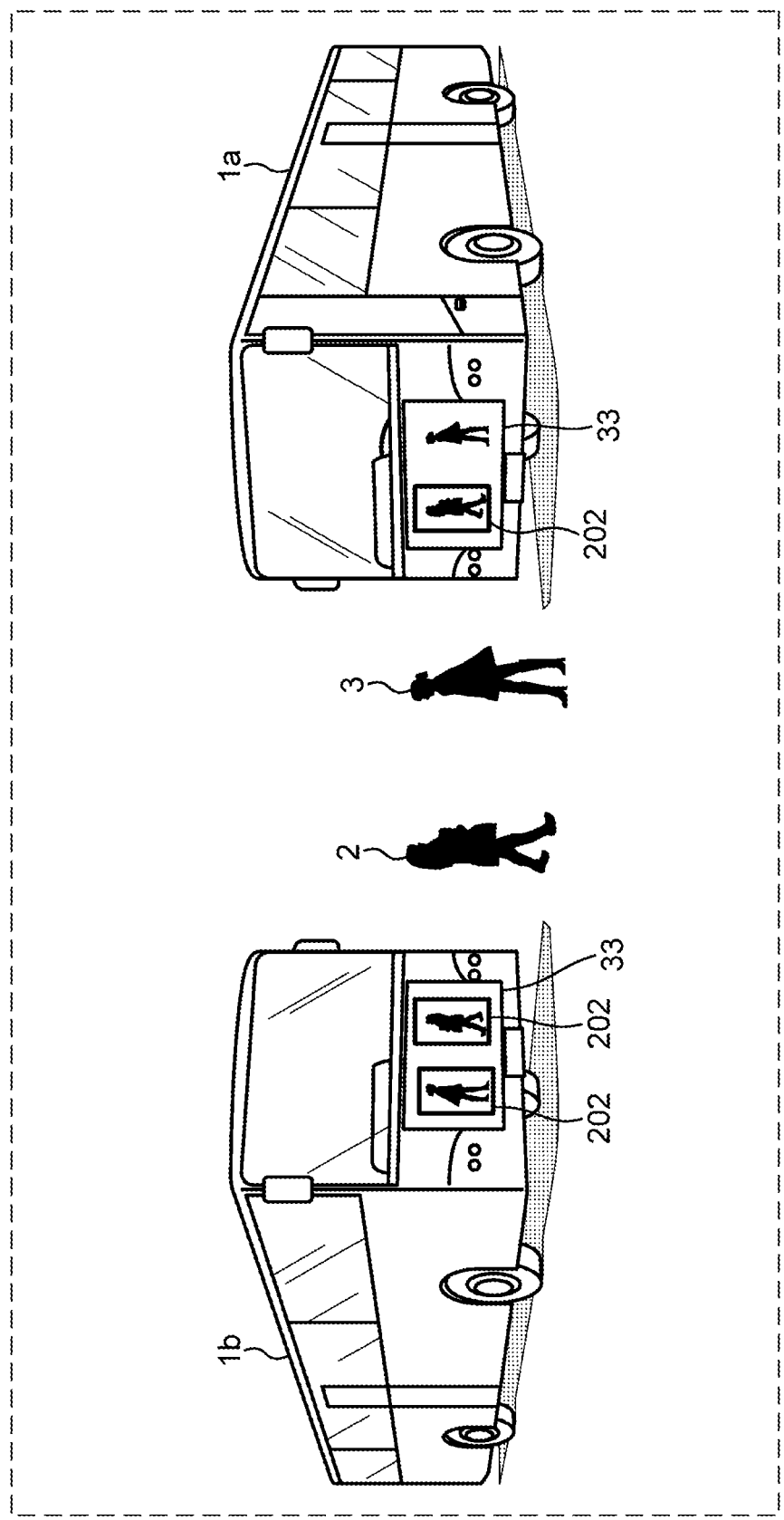
FIG. 8 is a diagram for describing a process for presenting a recognition result in a case where a plurality of automatic driving vehicles are present within a predetermined area according to the second modification of the first embodiment.

FIG. 8 is a diagram for describing a process for presenting a recognition result in a case where a plurality of automatic driving vehicles are present within a predetermined area according to the second modification of the first embodiment.

As illustrated in FIG. 8, a plurality of automatic driving vehicles 1a and 1b are present in the vicinity of the persons 2 and 3. In a case where the person 2 is detected by the automatic driving vehicle 1a, the display unit 33 of the automatic driving vehicle 1a displays in real time an image in which the rectangular frame 202 is added so as to enclose the detected person 2. The person 3 is not detected by the automatic driving vehicle 1a, and therefore, the rectangular frame 202 that encloses the person 3 is not displayed.

In a case where the persons 2 and 3 are detected by the automatic driving vehicle 1b, the display unit 33 of the automatic driving vehicle 1b displays in real time an image in which the rectangular frames 202 are added so as to respectively enclose the detected persons 2 and 3.

Accordingly, in a case where a plurality of automatic driving vehicles are present in the vicinity of a person, the person can easily identify an automatic driving vehicle that recognizes the person and an automatic driving vehicle that does not recognize the person among the plurality of automatic driving vehicles.

Figure 9:
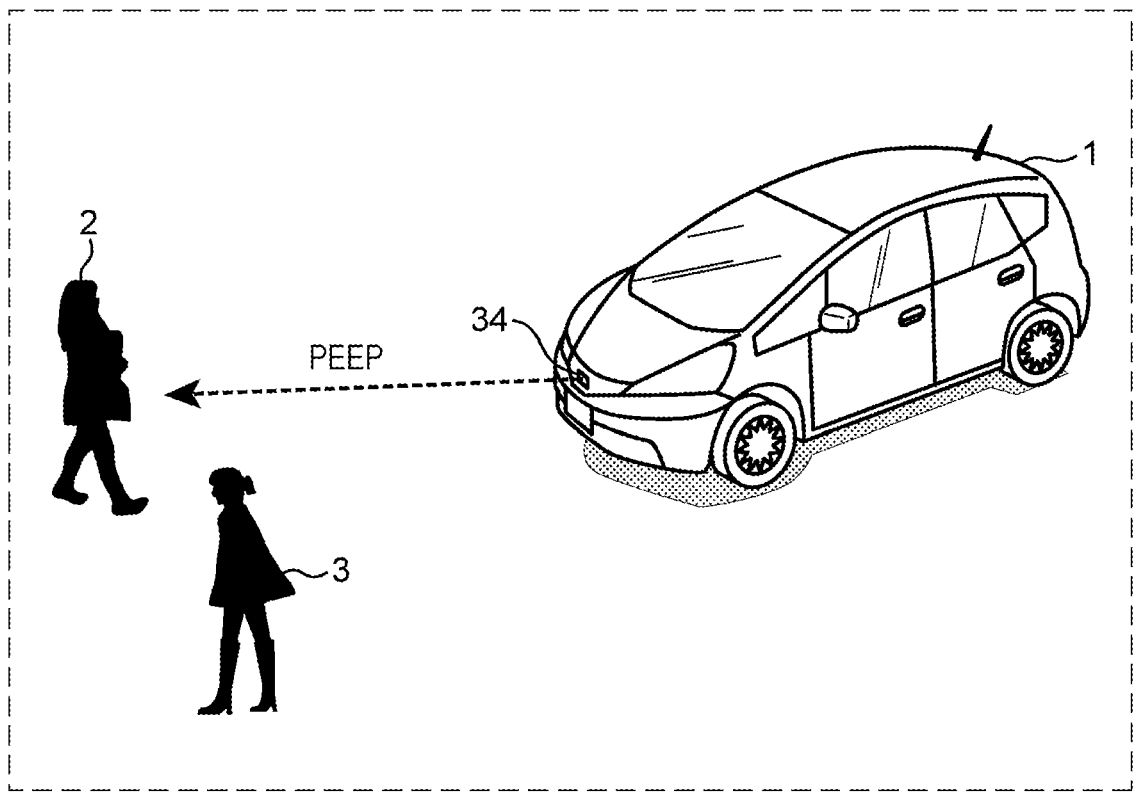
FIG. 9 is a diagram for describing a process for presenting a recognition result according to a third modification of the first embodiment.

FIG. 9 is a diagram for describing a process for presenting a recognition result according to a third modification of the first embodiment.

According to the third modification of the first embodiment, the recognition result presenting apparatus does not include the coordinate transformation unit 13, the coordinate transformation map data storage unit 221, and the laser emission unit 32 but includes a sound output unit 34 that outputs a predetermined sound in the direction in which the recognition target is present.

As illustrated in FIG. 9, the sound output unit 34 is a directional speaker, for example, and outputs a predetermined directional sound in the direction in which the detected person is present. The person 3 is not detected, and therefore, the predetermined sound is not output for the person 3. The sound output from the sound output unit 34 is a directional sound. Therefore, only the person 2 can hear the sound, and the person 3 is unable to hear the sound. Accordingly, the person 2 and the person 3 can each know whether he/she is recognized by the automatic driving vehicle 1 and can determine an action to be taken against the automatic driving vehicle 1, that is, determine whether he/she is to cross in front of the automatic driving vehicle 1, for example.

Figure 10:
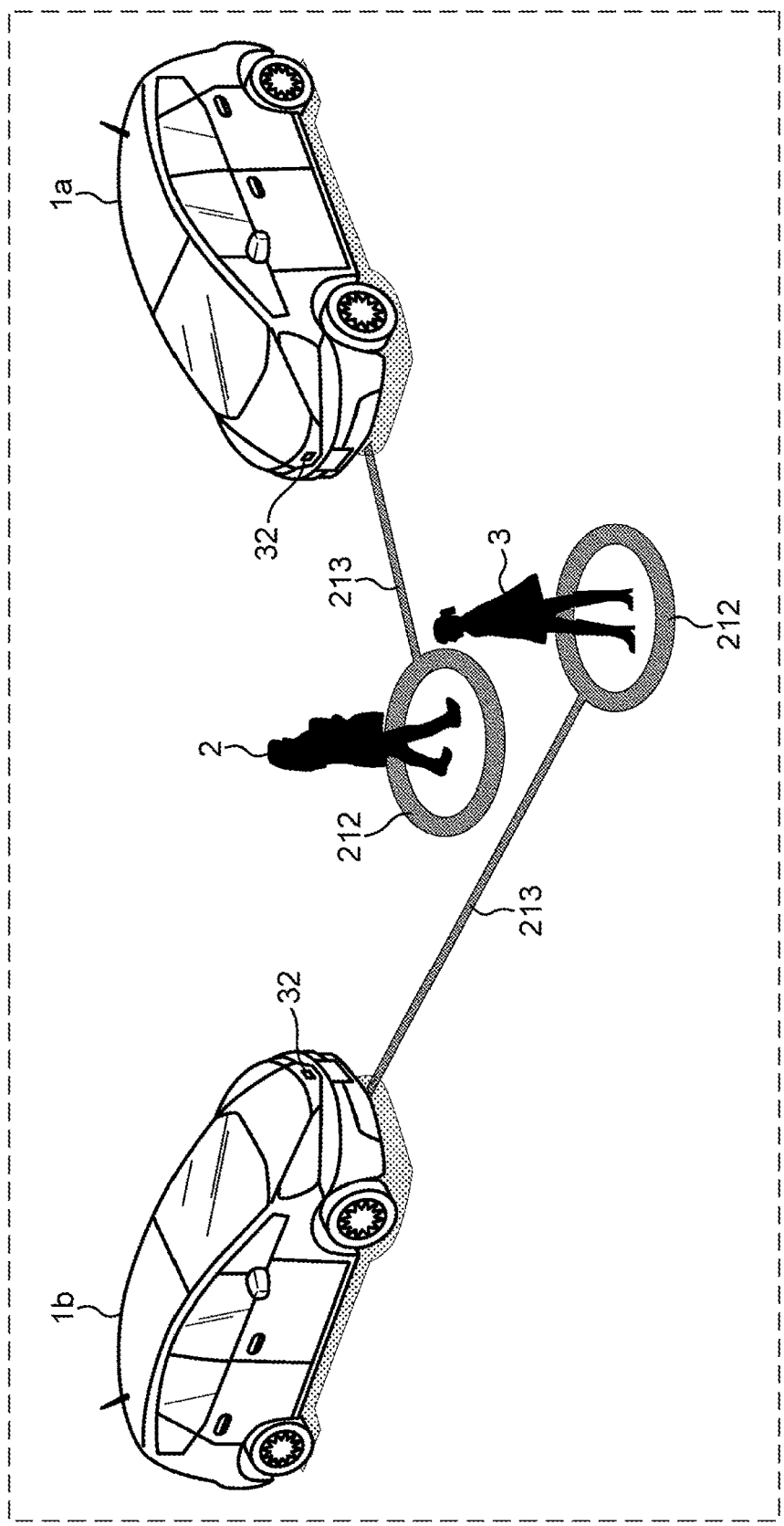
FIG. 10 is a diagram for describing a process for presenting a recognition result according to a fourth modification of the first embodiment.

FIG. 10 is a diagram for describing a process for presenting a recognition result according to a fourth modification of the first embodiment.

According to the fourth modification of the first embodiment, the laser emission unit 32 emits light in a predetermined shape toward the ground at the position where the recognition target is present, and additionally emits light to the straight line that connects the position on the ground at which the recognition target is present and the position on the ground at which the automatic driving vehicle is present.

As illustrated in FIG. 10, the plurality of automatic driving vehicles 1a and 1b are present in the vicinity of the persons 2 and 3. In the case where the person 2 is detected by the automatic driving vehicle 1a, the laser emission unit 32 of the automatic driving vehicle 1a emits the laser beam 212 in a predetermined shape toward the ground at the position where the person 2 is present, and additionally emits a laser beam 213 to the straight line that connects the position on the ground at which the person 2 is present and the position on the ground at which the automatic driving vehicle 1a is present. In FIG. 10, the laser beam 212 in a circle shape is emitted. The person 3 is not detected by the automatic driving vehicle 1a, and therefore, the laser beam 213 is not emitted to the straight line that connects the position on the ground at which the person 3 is present and the position on the ground at which the automatic driving vehicle 1a is present.

In a case where the person 3 is detected by the automatic driving vehicle 1b, the laser emission unit 32 of the automatic driving vehicle 1b emits the laser beam 212 in a predetermined shape toward the ground at the position where the person 3 is present, and additionally emits the laser beam 213 to the straight line that connects the position on the ground at which the person 3 is present and the position on the ground at which the automatic driving vehicle 1b is present. In FIG. 10, the laser beam 212 in a circle shape is emitted. The person 2 is not detected by the automatic driving vehicle 1b, and therefore, the laser beam 213 is not emitted to the straight line that connects the position on the ground at which the person 2 is present and the position on the ground at which the automatic driving vehicle 1b is present.

As described above, light in a predetermined shape is emitted toward the ground at the position where the person is present and, in addition, light is emitted to the straight line that connects the position on the ground at which the person is present and the position on the ground at which the automatic driving vehicle is present. Accordingly, in the case where a plurality of automatic driving vehicles are present in the vicinity of a person, the person can easily identify an automatic driving vehicle that recognizes the person and an automatic driving vehicle that does not recognize the person among the plurality of automatic driving vehicles.

The laser emission unit 32 may emit, whenever a person is detected, the laser beam 213 to the straight line that connects the position on the ground at which the person is present and the position on the ground at which the automatic driving vehicle is present. Alternatively, the laser emission unit 32 may emit, when a person is detected, the laser beam 213 only in a case where another automatic driving vehicle is present in the vicinity of the person. In this case, the automatic driving vehicle may further include a communication unit that broadcasts, within a predetermined area, information (identification information, for example) indicating the presence thereof and that receives information (identification information, for example) transmitted from the other automatic driving vehicle that is present within the predetermined area. In a case where the information transmitted from the other automatic driving vehicle is received, the laser emission unit 32 may emit the laser beam 213 to the straight line that connects the position on the ground at which the person is present and the position on the ground at which the automatic driving vehicle is present.

As described above, the laser beam 213 is emitted to the straight line that connects the position on the ground at which the person is present and the position on the ground at which the automatic driving vehicle is present only in the case where a plurality of automatic driving vehicles are present within a predetermined area, and therefore, power consumption can be reduced.

Figure 11:
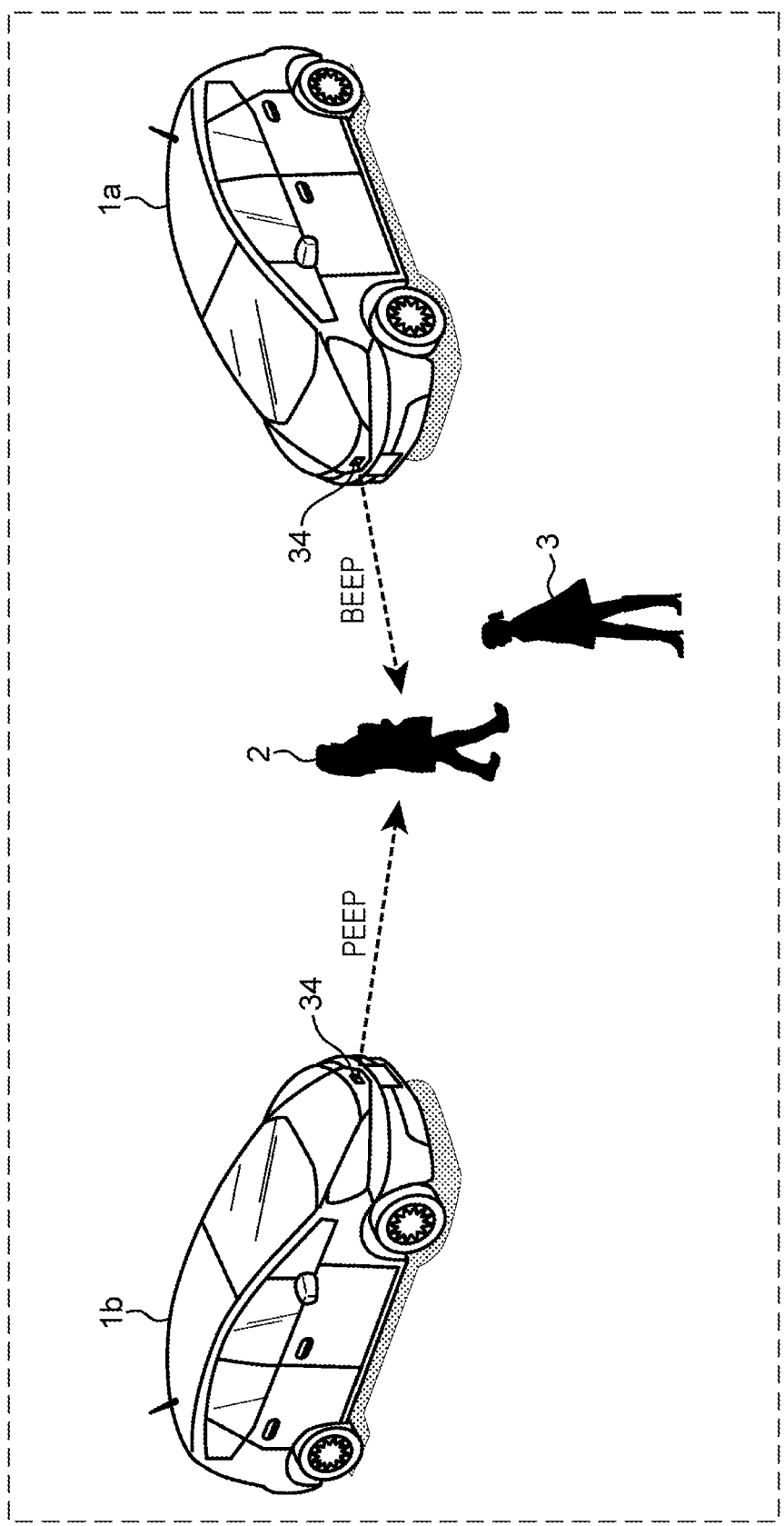
FIG. 11 is a diagram for describing a process for presenting a recognition result according to a fifth modification of the first embodiment.

FIG. 11 is a diagram for describing a process for presenting a recognition result according to a fifth modification of the first embodiment.

According to the fifth modification of the first embodiment, the recognition result presenting apparatus does not include the coordinate transformation unit 13, the coordinate transformation map data storage unit 221, and the laser emission unit 32 but includes the sound output unit 34 that outputs a predetermined sound in the direction in which the recognition target is present. The sound output unit 34 is a directional speaker, for example, and outputs a predetermined directional sound in the direction in which the detected person is present.

The recognition result presenting apparatus further includes a communication unit. The communication unit broadcasts, within a predetermined area, identification information for identifying the automatic driving vehicle and sound information indicating the type of sound output from the automatic driving vehicle, and receives identification information and sound information transmitted from another automatic driving vehicle present within the predetermined area. The sound output unit 34 can output a plurality of types of sounds. In a case where the communication unit receives identification information and sound information from another automatic driving vehicle, the sound output unit 34 determines whether the type of sound currently output from the automatic driving vehicle is identical to the type of sound of the other automatic driving vehicle indicated by the received sound information. In a case where the sound output unit 34 determines that the type of sound of the automatic driving vehicle is identical to the type of sound of the other automatic driving vehicle, the sound output unit 34 changes the current sound to a sound of another type.

As illustrated in FIG. 11, the plurality of automatic driving vehicles 1a and 1b are present in the vicinity of the persons 2 and 3. In the case where the person 2 is detected by the automatic driving vehicle 1a, the sound output unit 34 of the automatic driving vehicle 1a outputs a first sound in the direction in which the person 2 is present. The sound output unit 34 is configured to output the first sound by default. The person 3 is not detected by the automatic driving vehicle 1a, and therefore, the first sound is not output in the direction in which the person 3 is present. The communication unit of the automatic driving vehicle 1a broadcasts, within a predetermined area, identification information for identifying the automatic driving vehicle 1a and sound information indicating the type of sound (first sound) output from the automatic driving vehicle 1a.

The communication unit of the automatic driving vehicle 1b receives the identification information and sound information transmitted from the automatic driving vehicle 1a present within the predetermined area. The sound output unit 34 determines whether the type of sound (first sound) currently output from the automatic driving vehicle 1b is identical to the type of sound (first sound) of the automatic driving vehicle 1a indicated by the received sound information. In a case where the sound output unit 34 determines that the type of sound of the automatic driving vehicle 1b is identical to the type of sound of the automatic driving vehicle 1a, the sound output unit 34 changes the sound (first sound) to a sound of another type (second sound).

In a case where the person 2 is detected by the automatic driving vehicle 1b, the sound output unit 34 of the automatic driving vehicle 1b outputs the second sound, which is different from the first sound, in the direction in which the person 2 is present. The person 3 is not detected by the automatic driving vehicle 1b, and therefore, the second sound is not output in the direction in which the person 3 is present. Thereafter, the communication unit of the automatic driving vehicle 1b broadcasts, within the predetermined area, identification information for identifying the automatic driving vehicle 1b and sound information indicating the type of sound (second sound) output from the automatic driving vehicle 1b.

As described above, in the case where a plurality of automatic driving vehicles are present within a predetermined area, the plurality of automatic driving vehicles respectively output different sounds. Accordingly, in the case where a plurality of automatic driving vehicles are present in the vicinity of a person, the person can easily identify an automatic driving vehicle that recognizes the person and an automatic driving vehicle that does not recognize the person among the plurality of automatic driving vehicles.

In the first embodiment, a face-imitating device imitating the face of a person may be disposed on the surface of the automatic driving vehicle. The face-imitating device may turn its eyes and show a wink sign to a person (recognition target) detected by the person detection unit 12 to thereby present the result of recognition indicating that the automatic driving vehicle recognizes the person (recognition target).

The recognition target in the first embodiment is a person; however, the present disclosure is not specifically limited to this. The recognition target may be another vehicle, such as a bicycle or a car, an animal, such as a dog or a cat, or a baby stroller. Further, a recognition target that is moving may be detected.

In the first embodiment, the sensor 115 includes the camera 31, and the person detection unit 12 detects a person from an image captured by using the camera 31; however, the present disclosure is not specifically limited to this. The sensor 115 may include an obstacle sensor that detects the presence of an object present in a specific direction. In this case, the person detection unit 12 may determine that a person is detected when an object is detected by the obstacle sensor. Preferably, the laser emission unit 32 is disposed in the vicinity of the obstacle sensor. The sensor 115 may include a plurality of distance sensors that are horizontally aligned. In this case, the person detection unit 12 may determine that a person is detected when an object is detected by at least one of the plurality of distance sensors and may determine the direction in which the object is present and the distance to the object. The sensor 115 may include a 3D measurement device that measures a 3D form of the surroundings in space around the automatic driving vehicle 1. In this case, when a person is detected by the 3D measurement device, the person detection unit 12 may identify the direction in which the person is present and the distance to the person.

In the first embodiment, the presenting unit 114 may include at least one of the laser emission unit 32, the display unit 33, and the sound output unit 34. That is, any two or all of the presentation of the result of recognition by the laser emission unit 32, the presentation of the result of recognition by the display unit 33, and the presentation of the result of recognition by the sound output unit 34 may be combined.

Second Embodiment

Figure 12:
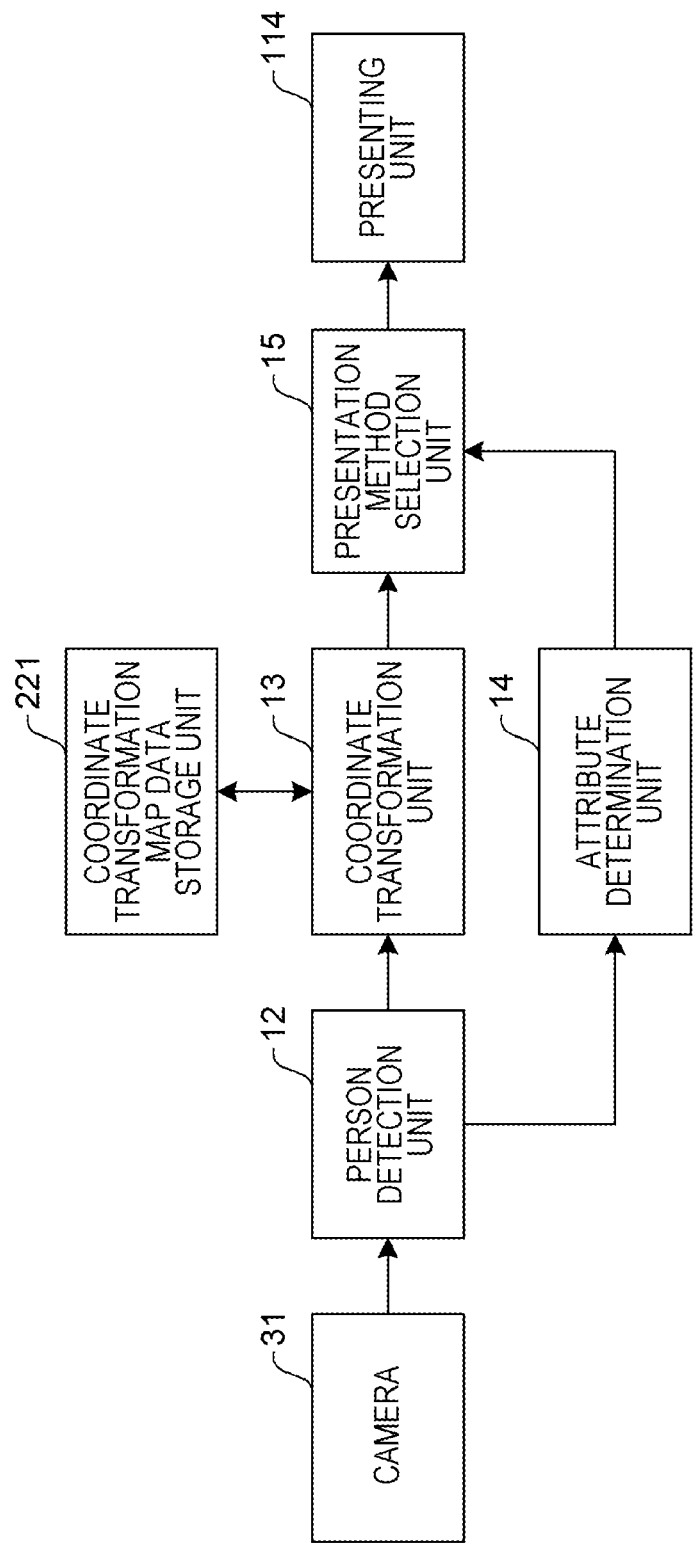
FIG. 12 is a diagram illustrating a configuration of a recognition result presenting apparatus according to a second embodiment.

FIG. 12 is a diagram illustrating a configuration of a recognition result presenting apparatus according to a second embodiment. The recognition result presenting apparatus illustrated in FIG. 12 includes the camera 31, the person detection unit 12, the coordinate transformation unit 13, an attribute determination unit 14, a presentation method selection unit 15, the presenting unit 114, and the coordinate transformation map data storage unit 221.

An automatic driving vehicle according to the second embodiment has a configuration identical to that of the automatic driving vehicle illustrated in FIG. 1 except for the automatic driving program 121 which further includes the attribute determination unit 14 and the presentation method selection unit 15. In the recognition result presenting apparatus illustrated in FIG. 12, components that are the same as those in FIG. 1 or FIG. 2 are assigned the same reference numerals, and description thereof will be omitted.

The attribute determination unit 14 determines attributes of a person detected by the person detection unit 12. Here, one of the attributes, that is, whether the person is a child or an elderly person, for example, is determined. The attribute determination unit 14 determines the attribute of a person from the features of the person detected by the person detection unit 12. For example, the attribute determination unit 14 estimates the height of a person detected by the person detection unit 12 from a captured image, and determines that the person is a child if the estimated height is equal to or lower than a predetermined height. For example, the attribute determination unit 14 compares an image of a person detected by the person detection unit 12 with an image that shows the features of elderly people, such as an image of a stooped elderly person, and determines that the person is an elderly person if the image of the detected person matches the image that shows the features of elderly people.

The presentation method selection unit 15 selects a presentation method to be used in accordance with the attribute determined by the attribute determination unit 14. In a case where the attribute determination unit 14 determines that the person is a child, for example, the presentation method selection unit 15 selects a presentation method in which characters are not used but a sign is used. In a case where the attribute determination unit 14 determines that the person is an elderly person, for example, the presentation method selection unit 15 selects a presentation method in which the laser beam is made brighter or the output sound is made louder.

The presenting unit 114 presents the result of recognition by using the presentation method selected by the presentation method selection unit 15. The presenting unit 114 includes at least one of the laser emission unit 32, the display unit 33, and the sound output unit 34.

For example, in the case where the presentation method selection unit 15 selects the presentation method in which characters are not used but a sign is used, the display unit 33 displays an image in which the person (recognition target) detected by the person detection unit 12 is indicated so as to be identifiable, and further superimposes a sign on the image instead of superimposing characters. If the detected person is not a child, the display unit 33 displays the captured image while superimposing characters "attention" on the image, for example. If the detected person is a child, the display unit 33 displays the captured image while superimposing a sign for calling "attention" on the image, for example. Accordingly, information to be provided can be communicated to children who are unable to read.

For example, in the case where the presentation method selection unit 15 selects the presentation method in which the laser beam is made brighter, the laser emission unit 32 emits a laser beam having increased brightness toward the person (recognition target) detected by the person detection unit 12.

For example, in the case where the presentation method selection unit 15 selects the presentation method in which the output sound is made louder, the sound output unit 34 outputs a sound having increased volume toward the person (recognition target) detected by the person detection unit 12.

Third Embodiment

Figure 13:
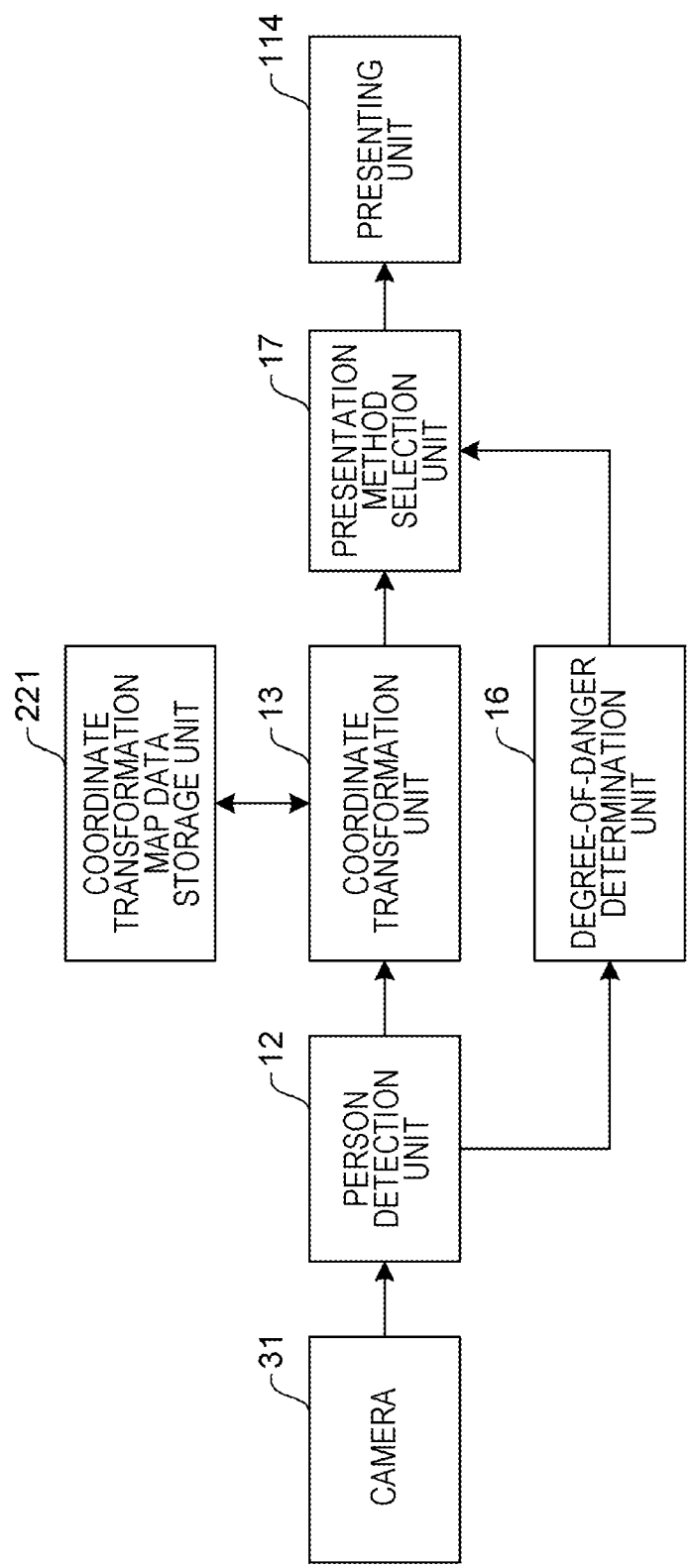
FIG. 13 is a diagram illustrating a configuration of a recognition result presenting apparatus according to a third embodiment.

FIG. 13 is a diagram illustrating a configuration of a recognition result presenting apparatus according to a third embodiment. The recognition result presenting apparatus illustrated in FIG. 13 includes the camera 31, the person detection unit 12, the coordinate transformation unit 13, a degree-of-danger determination unit 16, a presentation method selection unit 17, the presenting unit 114, and the coordinate transformation map data storage unit 221.

An automatic driving vehicle according to the third embodiment has a configuration identical to that of the automatic driving vehicle illustrated in FIG. 1 except for the automatic driving program 121, which further includes the degree-of-danger determination unit 16 and the presentation method selection unit 17. In the recognition result presenting apparatus illustrated in FIG. 13, components that are the same as those in FIG. 1 or FIG. 2 are assigned the same reference numerals, and description thereof will be omitted.

The degree-of-danger determination unit 16 determines the degree of danger to which the person (recognition target) detected by the person detection unit 12 is exposed. The degree of danger is one of a first degree of danger and a second degree of danger that is lower than the first degree of danger. For example, the degree-of-danger determination unit 16 estimates, from the captured image, the distance from the automatic driving vehicle 1 to the person. The degree-of-danger determination unit 16 determines the degree of danger to be the first degree of danger in a case where the estimated distance is equal to or shorter than a predetermined distance, and determines the degree of danger to be the second degree of danger that is relatively lower in a case where the estimated distance is longer than the predetermined distance.

The presentation method selection unit 17 selects a presentation method in accordance with the degree of danger determined by the degree-of-danger determination unit 16. The presentation method selection unit 17 makes the color of a laser beam used in the case where the degree-of-danger determination unit 16 determines the degree of danger to be the first degree of danger different from the color of a laser beam used in the case where the degree-of-danger determination unit 16 determines the degree of danger to be the second degree of danger. For example, the presentation method selection unit 17 selects a presentation method in which a red laser beam is used in the case where the degree of danger is determined to be the first degree of danger, and selects a presentation method in which a blue laser beam is used in the case where the degree of danger is determined to be the second degree of danger.

The presenting unit 114 presents the result of recognition by using the presentation method selected by the presentation method selection unit 17. The presenting unit 114 includes at least one of the laser emission unit 32, the display unit 33, and the sound output unit 34.

For example, in the case where the presentation method selection unit 17 selects the presentation method in which a red laser beam is used, the laser emission unit 32 emits a red laser beam toward the person (recognition target) detected by the person detection unit 12 and exposed to the first degree of danger. For example, in the case where the presentation method selection unit 17 selects the presentation method in which a blue laser beam is used, the laser emission unit 32 emits a blue laser beam toward the person (recognition target) detected by the person detection unit 12 and exposed to the second degree of danger. Accordingly, the recognition target can know the degree of danger on the basis of the color of the emitted light.

For example, in the case where the presentation method selection unit 17 selects the presentation method in which a red laser beam is used, the laser emission unit 32 may emit a red laser beam in a predetermined shape toward the ground at the position where the person (recognition target) detected by the person detection unit 12 and exposed to the first degree of danger is present. For example, in the case where the presentation method selection unit 17 selects the presentation method in which a blue laser beam is used, the laser emission unit 32 may emit a blue laser beam in a predetermined shape toward the ground at the position where the person (recognition target) detected by the person detection unit 12 and exposed to the second degree of danger is present.

For example, in the case where the presentation method selection unit 17 selects the presentation method in which a red laser beam is used, the laser emission unit 32 may emit a red laser beam in a predetermined shape toward the ground at the position where the person (recognition target) detected by the person detection unit 12 and exposed to the first degree of danger is present and may additionally emit a red laser beam to the straight line that connects the position on the ground at which the person (recognition target) is present and the position on the ground at which the automatic driving vehicle is present. For example, in the case where the presentation method selection unit 17 selects the presentation method in which a blue laser beam is used, the laser emission unit 32 may emit a blue laser beam in a predetermined shape toward the ground at the position where the person (recognition target) detected by the person detection unit 12 and exposed to the second degree of danger is present and may additionally emit a blue laser beam to the straight line that connects the position on the ground at which the person (recognition target) is present and the position on the ground at which the automatic driving vehicle is present.

The presentation method selection unit 17 makes a sound used in the case where the degree-of-danger determination unit 16 determines the degree of danger to be the first degree of danger different from a sound used in the case where the degree-of-danger determination unit 16 determines the degree of danger to be the second degree of danger. For example, the presentation method selection unit 17 selects a presentation method in which a first sound is output in the case where the degree of danger is determined to be the first degree of danger, and selects a presentation method in which a second sound that is different from the first sound is output in the case where the degree of danger is determined to be the second degree of danger. In the case where the presentation method in which the first sound is output is selected, the sound output unit 34 may output the first sound toward the person (recognition target) detected by the person detection unit 12 and exposed to the first degree of danger. In the case where the presentation method in which the second sound is output is selected, the sound output unit 34 may output the second sound toward the person (recognition target) detected by the person detection unit 12 and exposed to the second degree of danger.

For example, the presentation method selection unit 17 selects a presentation method in which a red rectangular frame is added so as to enclose the detected person present in an image in the case where the degree of danger is determined to be the first degree of danger, and selects a presentation method in which a blue rectangular frame is added so as to enclose the detected person present in an image in the case where the degree of danger is determined to be the second degree of danger. In the case where the presentation method in which a red rectangular frame is added so as to enclose the detected person present in an image is selected, the display unit 33 may display an image that includes the person (recognition target) detected by the person detection unit 12 and exposed to the first degree of danger to which a red rectangular frame is added so as to enclose the person. In the case where the presentation method in which a blue rectangular frame is added so as to enclose the detected person present in an image is selected, the display unit 33 may display an image that includes the person (recognition target) detected by the person detection unit 12 and exposed to the second degree of danger to which a blue rectangular frame is added so as to enclose the person.

In a case where a plurality of persons (recognition targets) are detected by the person detection unit 12, the degree-of-danger determination unit 16 may determine the degree of danger to which each of the plurality of persons (recognition targets) detected by the person detection unit 12 is exposed. Then, the presenting unit 114 may present the result of recognition to each of the plurality of persons (recognition targets) sequentially from the person (recognition target) that is exposed to the highest degree of danger. For example, in the case where a plurality of persons are detected by the person detection unit 12, the degree-of-danger determination unit 16 estimates, from the captured image, the distance from the automatic driving vehicle 1 to each of the plurality of persons and determines the degree of danger to which each of the plurality of persons is exposed sequentially such that a person for which the estimated distance is shorter is determined to be exposed to a higher degree of danger. Then, the presenting unit 114 presents the result of recognition preferentially to the person exposed to the highest degree of danger among the plurality of persons.

For example, in a case where the number of laser beams that can be emitted from the laser emission unit 32 at a time is limited, the laser emission unit 32 emits a laser beam preferentially to the person exposed to the highest degree of danger among the plurality of persons.

Figure 14:
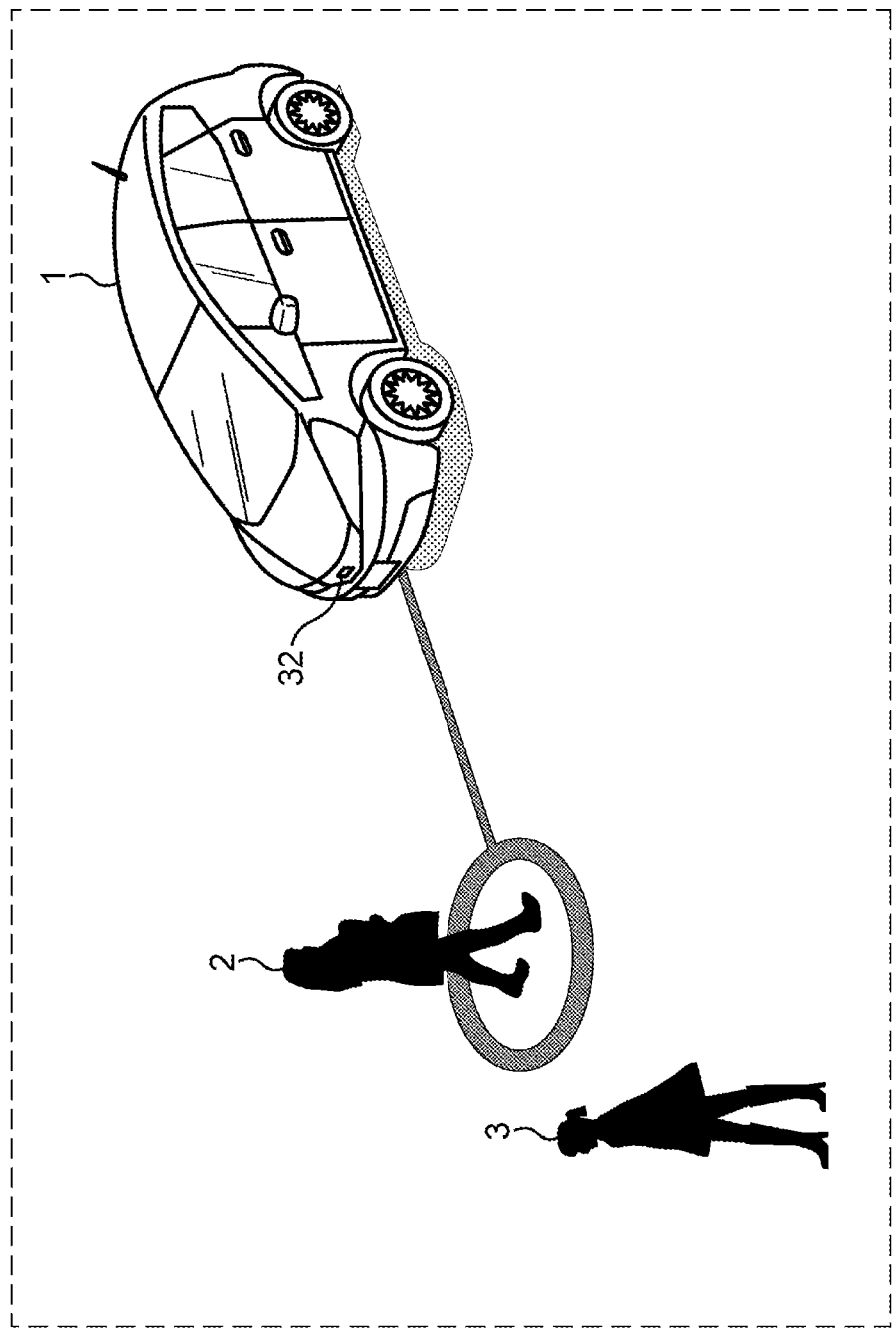
FIG. 14 is a diagram for describing a process for preferentially emitting light to a recognition target that is exposed to a high degree of danger.

FIG. 14 is a diagram for describing a process for preferentially emitting light to a recognition target that is exposed to a high degree of danger. In FIG. 14, the person 2 and the person 3 are detected by the person detection unit 12 of the automatic driving vehicle 1. The person 2 is present closer to the automatic driving vehicle 1 than the person 3, and therefore, the person 2 is determined to be exposed to a higher degree of danger than the person 3. In a case where the laser emission unit 32 can emit one laser beam at a time, the laser emission unit 32 emits a laser beam to only the person 2 exposed to the highest degree of danger among the plurality of persons 2 and 3.

In a case where the laser emission unit 32 can emit two laser beams at a time, the laser emission unit 32 may emit laser beams to the person 2 exposed to the highest degree of danger and the person 3 exposed to the second highest degree of danger respectively among the plurality of persons 2 and 3. At this time, it is preferable that the two laser beams have different colors.

For example, in a case where the number of sounds that can be output from the sound output unit 34 at a time is limited, the sound output unit 34 outputs a sound preferentially to the person exposed to the highest degree of danger among the plurality of persons.

Figure 15:
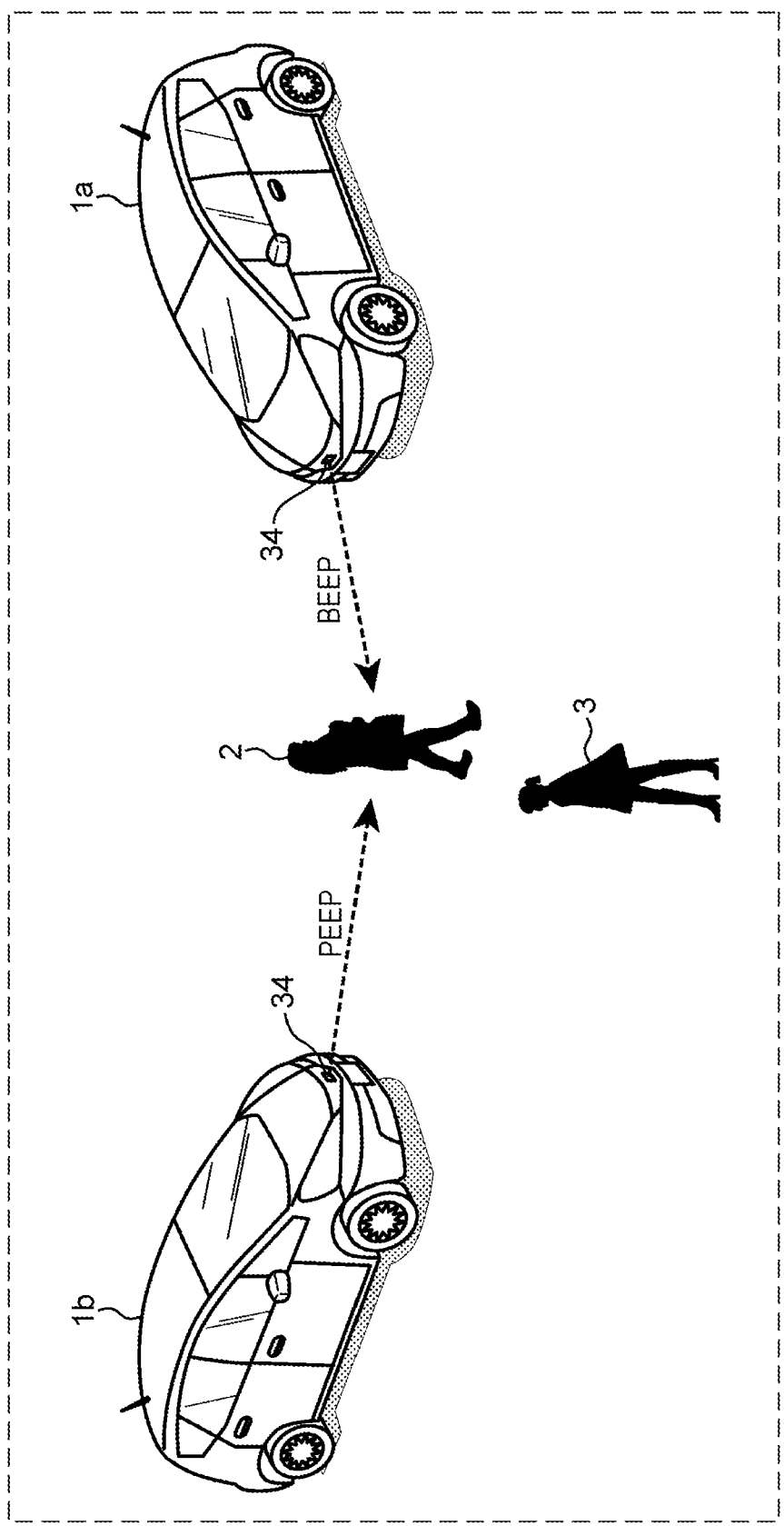
FIG. 15 is a diagram for describing a process for preferentially outputting a sound to a recognition target that is exposed to a high degree of danger.

FIG. 15 is a diagram for describing a process for preferentially outputting a sound to a recognition target that is exposed to a high degree of danger. In FIG. 15, both the person 2 and the person 3 are detected by the person detection unit 12 of the automatic driving vehicle 1a and by the person detection unit 12 of the automatic driving vehicle 1b. The person 2 is present closer to the automatic driving vehicle 1a and the automatic driving vehicle 1b than the person 3, and therefore, the person 2 is determined to be exposed to a higher degree of danger than the person 3. In a case where the sound output unit 34 can output one sound at a time, the sound output unit 34 outputs a sound to only the person 2 exposed to the highest degree of danger among the plurality of persons 2 and 3.

In a case where the sound output unit 34 can output two sounds at a time, the sound output unit 34 outputs sounds to the person 2 exposed to the highest degree of danger and the person 3 exposed to the second highest degree of danger respectively among the plurality of persons 2 and 3. At this time, it is preferable that the two sounds are different from each other.

In the third embodiment, the degree-of-danger determination unit 16 determines the degree of danger on the basis of the distance between the person and the automatic driving vehicle; however, the present disclosure is not specifically limited to this. The direction of movement of the person may be detected, and the degree of danger may be determined to be high if the detected direction of movement extends toward the direction of travel of the automatic driving vehicle. The direction of movement of the person can be detected by comparing an image captured currently with an image captured in the past. The direction of travel of the automatic driving vehicle can be detected by comparing the current position of the automatic driving vehicle with the position of the automatic driving vehicle in the past.

Note that in the first to third embodiments, the detection unit of the automatic driving vehicle may detect a manually driven vehicle driven by a driver within a predetermined area from the automatic driving vehicle, and the presenting unit may present, to the manually driven vehicle, the result of recognition indicating that the automatic driving vehicle recognizes the manually driven vehicle.

In the first to third embodiments, some of the constituent elements of the recognition result presenting apparatus may be included in a server that can communicate with the recognition result presenting apparatus over a network.

In the present disclosure, all or some of the units, apparatuses, or members or all or some of the functional blocks illustrated in the block diagram in the drawings may be implemented as one electronic circuit, such as a semiconductor device, a semiconductor integrated circuit (IC), or a large scale integration (LSI) circuit, or as a plurality of electronic circuits. The LSI circuit or the IC may be integrated into a single chip or may be constituted by combining a plurality of chips. For example, functional blocks other than the memory element may be integrated into a single chip. Here, a circuit called an LSI circuit or an IC may be used; however, the circuit may be one that is called a system LSI circuit, a very large scale integration (VLSI) circuit, or an ultra large scale integration (VLSI) circuit depending on the degree of integration. A field programmable gate array (FPGA) that is programmed after manufacture of the LSI circuit, or a reconfigurable logic device in which junctions within the LSI can be reconfigured or circuit sections within the LSI can be set up can be used for the same purpose.

In addition, the functions or operations of all or some of the units, apparatuses, or members can be executed or performed by software processing. In this case, the software is recorded to one or more non-transitory recording media, such as ROMs, optical discs, or hard disk drives. When the software is executed by a processing device (processor), functions specific to the software are executed by the processing device (processor) and peripheral devices. The system or apparatus may include the one or more non-transitory recording media to which the software is recorded, the processing device (processor), and any necessary hardware device, such as an interface, for example.

The recognition result presenting apparatus, the recognition result presentation method, and the autonomous moving body according to the present disclosure are useful as a recognition result presenting apparatus, a recognition result presentation method, and an autonomous moving body which allow the result of recognizing a recognition target that is present around an autonomous moving body to be presented.

What is claimed is:

1. A system comprising:
   a light emitter mounted on an autonomous moving body;
   a processor; and
   a memory storing thereon a computer program, which when executed by the processor, causes the processor to perform operations including:
     acquiring positional information of a recognition target present within a predetermined range around the autonomous moving body, the positional information having been generated by detecting the recognition target via a sensor mounted on the autonomous moving body; and
     emitting, via the light emitter, a light to the detected recognition target to alert the recognition target that the autonomous moving body recognizes the recognition target after the positional information is acquired.

2. The system according to claim 1, wherein
   the light is at least partly emitted onto a ground on which the recognition target is present.

3. The system according to claim 2, wherein
   the emitted light has a predetermined pattern on the ground.

4. The system according to claim 3, wherein
   the recognition target is a person, and
   the predetermined pattern includes
     a first part for informing the person of being the recognition target, and
     a second part for informing the person that the light is emitted from the autonomous moving body.

5. The system according to claim 4, wherein
   the second part has a linear shape extending between the autonomous moving body and the recognition target.

6. The system according to claim 1, wherein
   the light is at least partly emitted onto a ground between the light emitter and the recognition target.

7. The system according to claim 1, wherein
   the sensor includes a camera configured to capture an image of a scene within the predetermined range.

8. The system according to claim 7, wherein
   in the emitting, an image obtained from the captured image is presented to the recognition target using the light.

9. The system according to claim 8, wherein
   the presented image is an image obtained by horizontally flipping the captured image.

10. The system according to claim 8, wherein
    the light emitter is included in a display mounted on a surface of the autonomous moving body.

11. The system according to claim 1, wherein
    the operations further include
      determining an attribute of the detected recognition target, and
    the emitted light is different depending on the attribute of the detected recognition target.

12. The system according to claim 1, wherein
    the operations further include
      determining a degree of danger to which the detected recognition target is exposed, and
    the emitted light is different depending on the degree of danger.

13. The system according to claim 12, wherein
    the emitted light has a different color depending on the degree of danger.

14. The system according to claim 1, wherein
    the operations further include
      outputting, via a speaker mounted on the autonomous moving body, a sound to the detected recognition target to alert the recognition target that the autonomous moving body recognizes the recognition target after the positional information is acquired.

15. The system according to claim 14, wherein
    the operations further include
      determining a degree of danger to which the detected recognition target is exposed, and
    the output sound is different depending on the degree of danger.

16. The system according to claim 1, wherein
    the light emitter is a laser or a light-emitting diode.

17. The system according to claim 1, wherein
    the autonomous moving body is a car, a truck, or a bus.

18. An autonomous moving body comprising:
    the system according to claim 1; and
    a controller that controls movement of the autonomous moving body in accordance with a situation of the detected recognition target.

* * * * *